(12) United States Patent
Kim et al.

(10) Patent No.: US 12,238,529 B2
(45) Date of Patent: Feb. 25, 2025

(54) ELECTRONIC DEVICE AND METHOD OF CONTROLLING ELECTRONIC DEVICE IN COMMUNICATION NETWORK SUPPORTING DYNAMIC SPECTRUM SHARING

(71) Applicant: Samsung Electronics Co., Ltd., Suwon-si (KR)

(72) Inventors: Dooyoung Kim, Suwon-si (KR); Euichang Jung, Suwon-si (KR); Sunmin Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 756 days.

(21) Appl. No.: 17/502,822

(22) Filed: Oct. 15, 2021

(65) Prior Publication Data

US 2022/0124511 A1  Apr. 21, 2022

Related U.S. Application Data

(63) Continuation of application No. PCT/KR2021/014240, filed on Oct. 14, 2021.

(30) Foreign Application Priority Data

Oct. 19, 2020 (KR) .................... 10-2020-0135429

(51) Int. Cl.
*H04W 16/14* (2009.01)
*H04W 88/06* (2009.01)

(52) U.S. Cl.
CPC ........... *H04W 16/14* (2013.01); *H04W 88/06* (2013.01)

(58) Field of Classification Search
CPC ..... H04W 16/02; H04W 16/06; H04W 16/10; H04W 16/12; H04W 16/14; H04W 88/04; H04W 88/06; H04W 88/10
See application file for complete search history.

(56) References Cited

U.S. PATENT DOCUMENTS

2013/0208587 A1   8/2013 Bala et al.
2017/0331577 A1*  11/2017 Parkvall ............... H04L 5/1469
(Continued)

FOREIGN PATENT DOCUMENTS

| WO | WO-2017165405 A2 * | 9/2017  | .......... H04L 1/1685 |
| WO | WO-2018231918 A1 * | 12/2018 | ............ H04B 1/713 |
| WO | WO-2019005797 A1 * | 1/2019  | ........... H04W 16/14 |
| WO | WO-2019033017 A1 * | 2/2019  | .......... H04L 5/0053 |
| WO | WO-2019063819 A1 * | 4/2019  | ....... H04W 52/0216 |
| WO | 2020/101852 A1     | 5/2020  | |

OTHER PUBLICATIONS

Maximov et al., "5G NR and 4G LTE Coexistence", MediaTek White Paper, Mar. 3, 2020.
(Continued)

*Primary Examiner* — Kevin D Mew
(74) *Attorney, Agent, or Firm* — Jefferson IP Law, LLP

(57) ABSTRACT

An electronic device is provided. The electronic device includes a communication processor, at least one Radio Frequency Integrated Circuit (RFIC) connected thereto, and an antenna connected through the at least one RFIC and configured to transmit and receive a signal corresponding to at least one communication network. The communication processor is configured to control the electronic device to receive a signal corresponding to a first communication network from a first base station corresponding to the first communication network supporting a first frequency band through the antenna, identify information related to a second communication network supporting a second frequency band including at least a portion of the first frequency band, identify a time interval allocated for transmission of data corresponding to the second communication network on the basis of the information related to the second communication network, and operate in a sleep state in the identified time interval.

10 Claims, 18 Drawing Sheets

(56) References Cited

U.S. PATENT DOCUMENTS

| | | | |
|---|---|---|---|
| 2017/0331670 A1* | 11/2017 | Parkvall | H04W 52/0229 |
| 2018/0145818 A1* | 5/2018 | Choi | H04L 5/023 |
| 2019/0141538 A1 | 5/2019 | Jones | |
| 2019/0150088 A1 | 5/2019 | Sun et al. | |
| 2019/0268971 A1* | 8/2019 | Talarico | H04W 76/27 |
| 2019/0297579 A1* | 9/2019 | Bhattad | H04W 72/232 |
| 2019/0306923 A1* | 10/2019 | Xiong | H04J 13/0062 |
| 2019/0327765 A1 | 10/2019 | Mukherjee et al. | |
| 2019/0363843 A1* | 11/2019 | Gordaychik | H04L 1/08 |
| 2020/0170022 A1 | 5/2020 | Jones | |
| 2020/0259896 A1* | 8/2020 | Sachs | H04W 56/0065 |
| 2021/0120555 A1* | 4/2021 | Badic | H04W 72/12 |
| 2021/0282104 A1* | 9/2021 | Sagar | H04W 76/16 |

OTHER PUBLICATIONS

Apple Inc, R4-2000086, "Introduction of LTE/NR spectrum sharing in band 48/n48 frequency range", 3GPP RAN WG4 Meeting #94-e, Electronic meeting, Feb. 24 to Mar. 6, 2020.

Google Inc., R4-2002048, "Views on dynamic spectrum sharing between LTE band 48 and NR band n48", 3GPP RAN WG4 Meeting #94-e, Online, Feb. 24 to Mar. 6, 2020.

International Search Report and written opinion dated Jan. 7, 2022, issued in International Application No. PCT/KR2021/014240.

* cited by examiner

| # | Slot 0 | Slot 1 | Slot 2 | Slot 3 | Slot 4 | Slot 5 | Slot 6 | Slot 7 | Slot 8 | Slot 9 |
|---|---|---|---|---|---|---|---|---|---|---|
| 1 |  | DL |  |  |  |  | DL | DL |  |  |
| 2 |  | DL | DL |  |  |  |  | DL |  |  |
| 3 |  | DL |  |  |  |  | DL | DL |  |  |
| 4 |  | DL | DL |  |  |  |  |  |  |  |
| 5 |  | DL |  |  |  |  | DL |  |  |  |

| # | Slot 0 | Slot 1 | Slot 2 | Slot 3 | Slot 4 | Slot 5 | Slot 6 | Slot 7 | Slot 8 | Slot 9 |
|---|---|---|---|---|---|---|---|---|---|---|
| Pattern | X | O | O | X | X | X | O | O | X | X |

X : Sleep
O : DCI monitoring

| # | Slot 0 | Slot 1 | Slot 2 | Slot 3 | Slot 4 | Slot 5 | Slot 6 | Slot 7 | Slot 8 | Slot 9 |
|---|---|---|---|---|---|---|---|---|---|---|
| mbsfn |  |  |  |  |  |  |  |  |  |  |

| # | Slot 0 | Slot 1 | Slot 2 | Slot 3 | Slot 4 | Slot 5 | Slot 6 | Slot 7 | Slot 8 | Slot 9 |
|---|---|---|---|---|---|---|---|---|---|---|
| Pattern | X | O | O | X | X | X | X | O | O | X |

X : Sleep
O : DCI monitoring

@# ELECTRONIC DEVICE AND METHOD OF CONTROLLING ELECTRONIC DEVICE IN COMMUNICATION NETWORK SUPPORTING DYNAMIC SPECTRUM SHARING

CROSS-REFERENCE TO RELATED APPLICATION(S)

This application is a continuation application, claiming the benefit priority under § 365(c), of an International application No. PCT/KR2021/014240, filed on Oct. 14, 2021, which is based on and claims the benefit of a Korean patent application number 10-2020-0135429, filed on Oct. 19, 2020, in the Korean Intellectual Property Office, the disclosure of which is incorporated by reference herein in its entirety.

TECHNICAL FIELD

The disclosure relates generally to an electronic device. More particularly, the disclosure relates to a method of controlling an electronic device in a communication network supporting dynamic spectrum sharing.

BACKGROUND ART

According to the widespread adaptation of portable terminals providing various functions due to the recent development of a mobile communication technology, efforts to develop a $5^{th}$ generation (5G) communication system to meet an increasing wireless data traffic demand are being made. The 5G communication system considers implementation in a higher frequency band (for example, mmWave band or band of 25 to 60 GHz) in addition to a 3G communication system and a frequency band used for a Long Term Evolution (LTE) communication system in order to provide a higher data transmission speed so as to achieve a higher data transmission rate.

For example, in the 5G communication system, technologies such as beamforming, massive multiple input, multiple output (MIMO), Full Dimensional MIMO (FD-MIMO), an array antenna, analog beam-forming, and a large scale antenna are being discussed to mitigate a propagation path loss in the mmWave band and increase a propagation transmission distance.

In order to implement 5G communication, a Stand Alone (SA) scheme and a Non-Stand Alone (NSA) scheme are considered. The SA scheme may be a scheme using only a New Radio (NR) system, and the NSA scheme may be a scheme using both the NR system and the existing LTE system. In the NSA scheme, a user terminal may use not only an evolved Node B (eNB) of the LTE system but also a next generation Node B (gNB) of the NR system. A technology that allows the user terminal to use different types of communication systems may be named dual connectivity.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Aspects of the disclosure are to address at least the above-mentioned problems and/or disadvantages and to provide at least the advantages described below. Accordingly, an aspect of the disclosure is to provide a Dynamic Spectrum Sharing (DSS). DSS is a technology that allows different wireless communication technologies (for example, a long term evolution (LTE) communication scheme and a New Radio (NR) communication scheme) to be used in the same frequency band. For example, according to DSS, respective electronic devices supporting LTE and NR may share resources in the same frequency and all receive the service through dynamical allocation of the same frequency resources to LTE communication network data or NR communication network data.

As an example of the DSS technology, NR communication network data may be transmitted using a Multimedia Broadcast multicast service Single Frequency Network (MBSFN) subframe defined for an MBSFN service in are LTE communication scheme. When the NR communication network data is transmitted using the MBSFN subframe, the electronic device does not perform Cell-specific Reference Signal (CRS) rate matching, and thus the base station does not need to inform the electronic device of LTE CRS information. The electronic device does not receive LTE CRS information from the base station and thus is not aware of the location of the MBSFN subframe, and accordingly, the electronic device may monitor control data up to the non-MBSFN subframe rather than the MBSFN subframe. As the electronic device transmitting and receiving data through the MBSFN-based DSS technology performs monitoring up to the non-MBSFN subframe in which no NR communication network data is transmitted, unnecessary power consumption and a heating problem may be generated.

When the electronic device according to various embodiments transmits and receives data through a frequency band supporting DSS, it is possible to reduce unnecessary power consumption and improve a heating problem generated according to monitoring of downlink control data by expecting or identifying a slot (or subframe) (for example, a non-MBSFN subframe) which is not used for NR resource allocation and controlling the corresponding slot (or subframe) to operate in a sleep state.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication processor, at least one Radio Frequency Integrated Circuit (RFIC) connected to the communication processor, and an antenna connected through the at least one RFIC and configured to transmit and receive a signal corresponding to at least one communication network, wherein the communication processor is configured to control the electronic device to receive a signal corresponding to a first communication network from a first base station corresponding to the first communication network supporting a first frequency band through the antenna, identify information related to a second communication network supporting a second frequency band including at least a portion of the first frequency band, identify a time interval allocated for transmission of data corresponding to the second communication network, based on the information related to the second communication network, and control the electronic device to operate in a sleep state in the identified time interval.

In accordance with another aspect of the disclosure, a method of controlling an electronic device is provided. The method includes receiving a signal corresponding to a first communication network from a first base station corresponding to the first communication network supporting a first frequency band through the antenna, identifying information related to a second communication network supporting a second frequency band including at least a portion of the first frequency band, identifying a time interval allocated for transmission of data corresponding to the second communication network, based on the information related to the second communication network, and switching to a sleep state in the identified time interval.

Advantageous Effects

According to various embodiments, when an electronic device transmits and receives data through a frequency band supporting DSS, it is possible to reduce unnecessary power consumption generated according to monitoring of a downlink control channel and improve a heating problem by expecting or identifying a slot (or subframe) (for example, a non-MBSFN subframe) which is not used for NR resource allocation and controlling the corresponding slot (or subframe) to operate in a sleep state.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
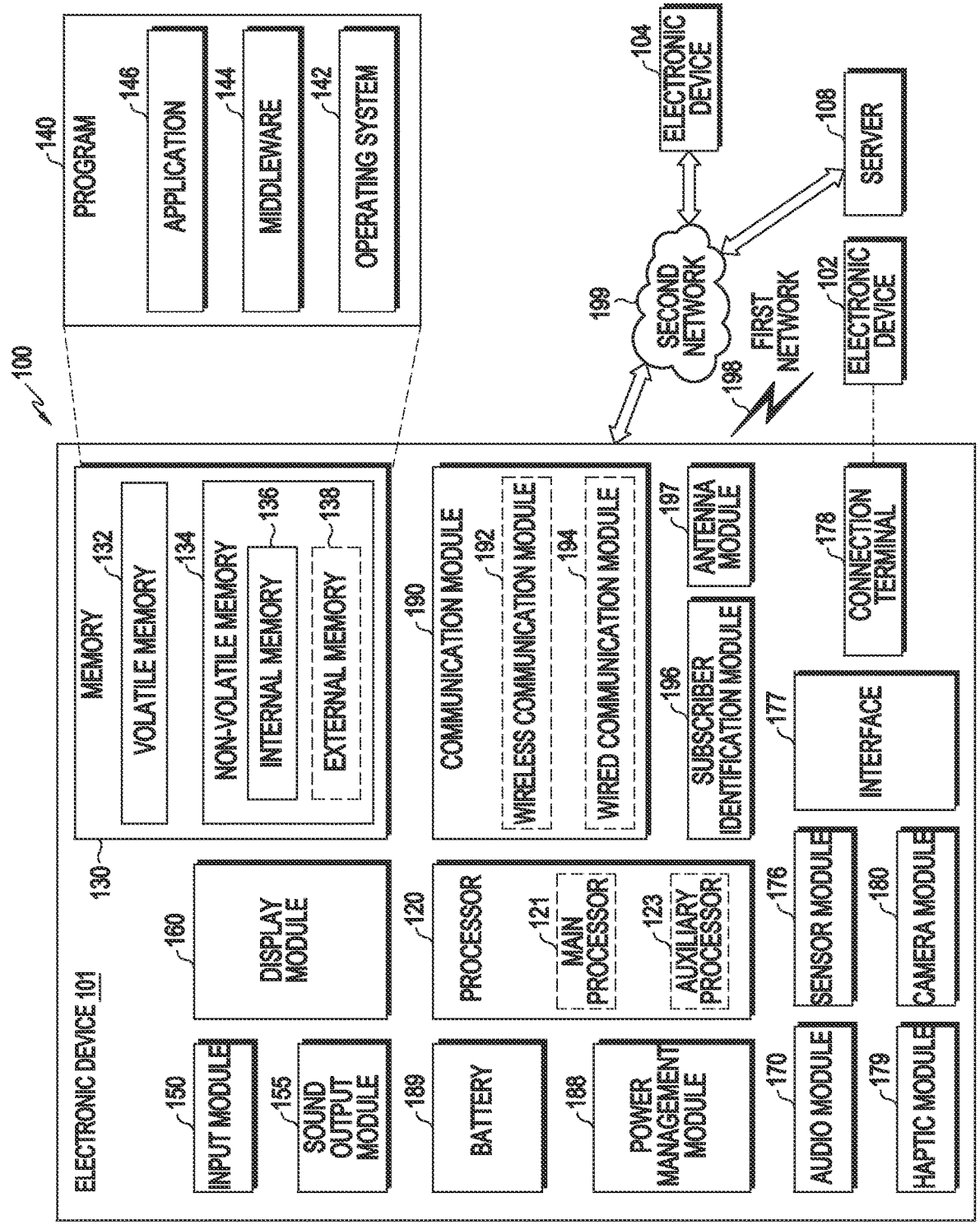
FIG. 1 is a block diagram illustrating an electronic device within a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module), A corresponding one of these communication modules may communicate with the external electronic device 104 via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO) serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
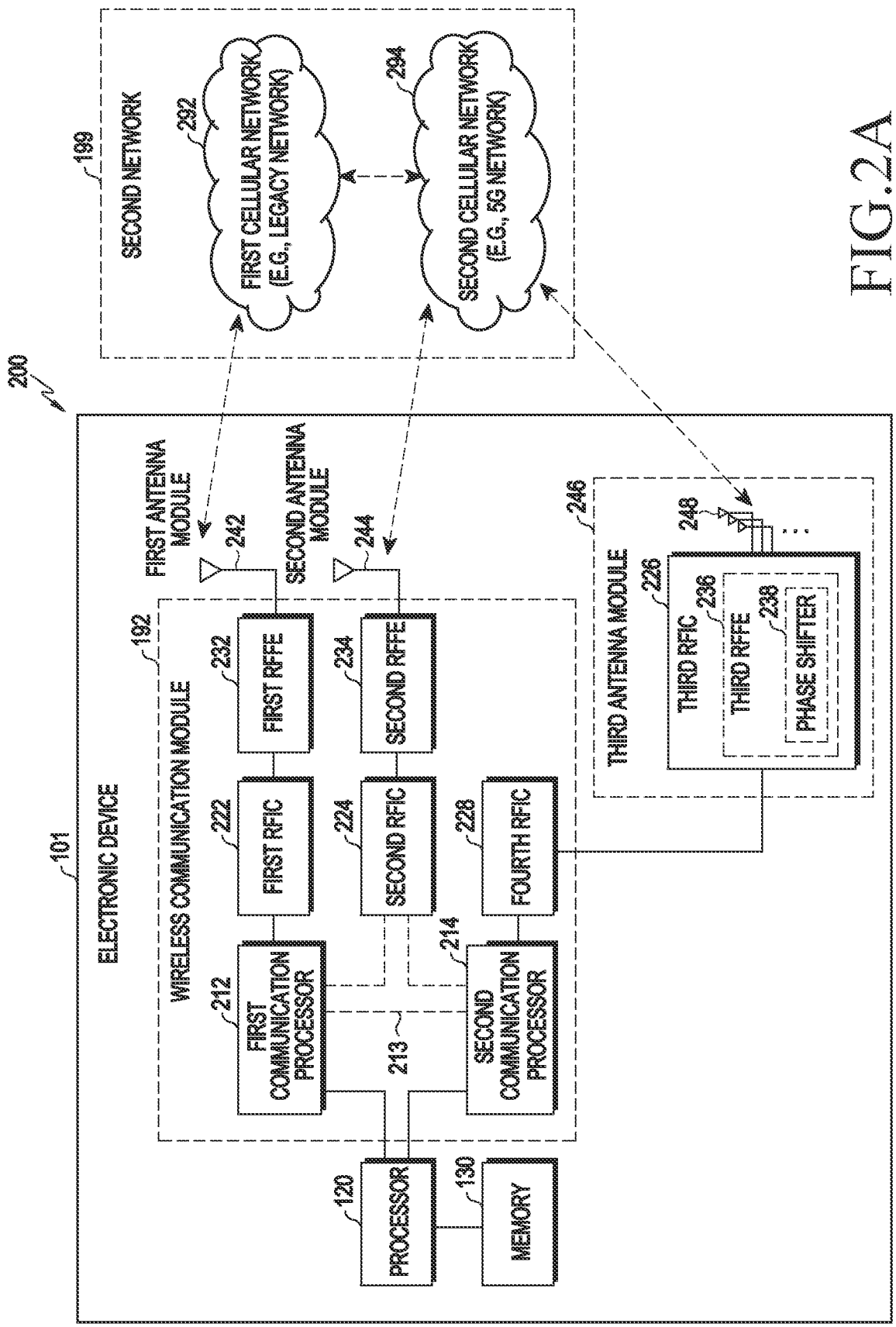
FIG. 2A is a block diagram of an electronic device for supporting legacy network communication and fifth generation (5G) network communication according to an embodiment of the disclosure.

FIG. 2A is a block diagram of the electronic device for supporting legacy network communication and 5G network communication according to an embodiment of the disclosure.

Referring to FIG. 2A, in the system 200, the electronic device 101 may include a first communication processor 212, a second communication processor 214, a first RFIC 222, a second RFIC 224, a third RFIC 226, a fourth RFIC 228, a first Radio Frequency Front End (RFFE) 232, a second RFFE 234, a first antenna module 242, a second antenna module 244, a third antenna module 246, and antennas 248. The electronic device 101 may further include the processor 120 and the memory 130. A second network 199 may include a first cellular network 292 and a second cellular network 294. According to another embodiment, the electronic device 101 may further include at least one of the elements illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may configure at least a part of the wireless communication module 192. According to another embodiment, the fourth RFIC 228 may be omitted or may be included as a part of the third RFIC 226.

The first communication processor 212 may support establishment of a communication channel in a band to be used for wireless communication with the first cellular network 292 and legacy network communication through the established communication channel. According to various embodiments, the first cellular network may be a legacy network including a second generation (2G), third generation (3G), fourth generation (4G), or Long Term Evolution (LTE) network. The second communication processor 214 may support establishment of a communication channel corresponding to a predetermined band (for example, about 6 GHz to about 60 GHz) among bands to be used for wireless communication with the second cellular network 294 and 5G network communication through the established communication channel. According to various embodiments, the second cellular network 294 may be a 5G network defined in the third generation partnership project (3GPP). In addition, according to an embodiment, the first communication processor 212 or the second communication processor 214 may support establishment of a communication channel corresponding to another predetermined band (for example, equal to or lower than about 6 GHz) among bands to be used for wireless communication with the second cellular network 294 and 5G network communication through the established communication channel.

The first communication processor 212 may transmit and receive data to and from the second communication processor 214. For example, data classified as data to be transmitted through the second cellular network 294 may be changed to be transmitted through the first cellular network 292. In this case, the first communication processor 212 may receive transmission data from the second communication processor 214. For example, the first communication processor 212 may transmit and receive data to and from the second communication processor 214 through an interface 213 between processors. The interface 213 between processors may be implemented as, for example, a Universal Asynchronous Receiver/Transmitter (UART) (for example, a High Speed-UART (HS-UART) or a Peripheral Component Interconnect bus express (PCIe) interface), but the interface type is not limited thereto. Alternatively, the first communication processor 212 and the second communication processor 214 may exchange control information and packet data information through, for example, a shared memory. The first communication processor 212 may transmit and receive various pieces of information such as sensing information, information on an output intensity, and Resource Block (RB) allocation information to and from the second communication processor 214.

According to implementation, the first communication processor 212 may not be directly connected to the second communication processor 214. In this case, the first communication processor 212 may transmit and receive data to and from the second communication processor 214 through the processor 120 (for example, an application processor). For example, the first communication processor 212 and the second communication processor 214 may transmit and receive data to and from the processor 120 (for example, an application processor) through an HS-UART interface or a PCIe interface, but there is no limitation on the type thereof. Alternatively, the first communication processor 212 and the second communication processor 214 may exchange control information and packet data information with the processor 120 (for example, an application processor) through a shared memory.

According to an embodiment, the first communication processor 212 and the second communication processor 214 may be implemented within a single chip or a single package. According to various embodiments, the first communication processor 212 or the second communication processor 214 may be constructed with the processor 120, the auxiliary processor 123, or the communication module 190 within a single chip or a single package.

Figure 2B:
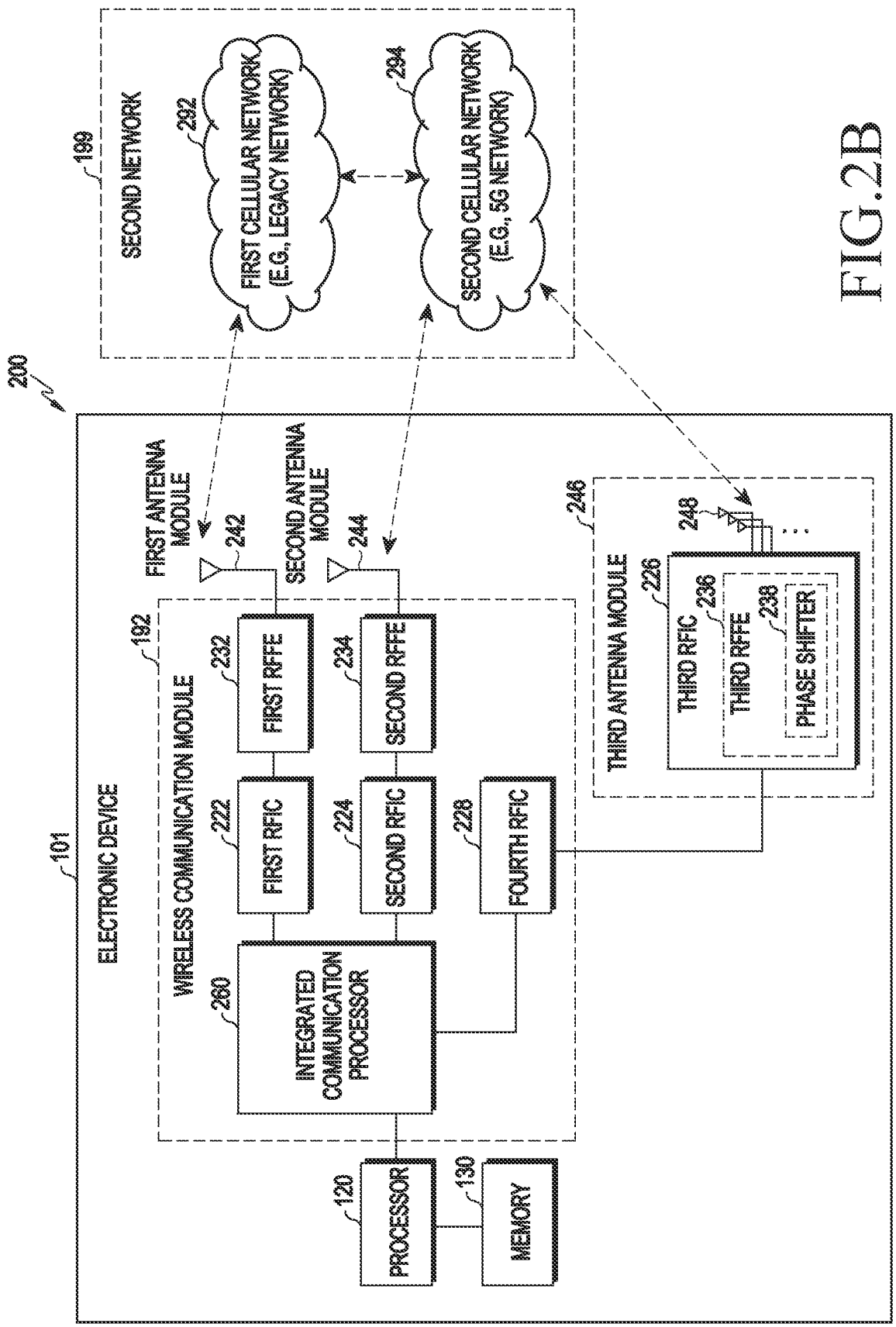
FIG. 2B is a block diagram of the electronic device for supporting legacy network communication and 5G network communication according to an embodiment of the disclosure.

FIG. 2B is a block diagram of the electronic device for supporting legacy network communication and 5G network communication according to an embodiment of the disclosure.

Referring to FIG. 2B, an integrated communication processor 260 may support all functions for communication with the first cellular network 292 and the second cellular network 294.

In transmission, the first RFIC 222 may convert a baseband signal generated by the first communication processor 212 into a Radio Frequency (RF) signal of about 700 MHz to about 3 GHz used for the first cellular network 292 (for example, legacy network). In reception, the RF signal may be acquired from the first cellular network 292 (for example, legacy network) through an antenna (for example, the first antenna module 242) and may be preprocessed through the RFFE (for example, first RFFE 232). The first RFIC 222 may convert the preprocessed RF signal into a baseband signal to be processed by the first communication processor 212.

In transmission, the second RFIC 224 may convert a baseband signal generated by the first communication processor 212 or the second communication processor 214 into an RF signal (hereinafter, referred to as a 5G Sub6 RF signal) in a Sub6 band (for example, equal to or lower than about 6 GHz) used in the second cellular network 294 (for example, 5G network). In reception, a 5G Sub6 RF signal may be acquired from the second cellular network 294 (for example, 5G network) through an antenna (for example, the second antenna module 244) and may be preprocessed through the RFFE (for example, second RFFE 234). The second RFIC 224 may convert the preprocessed 5G Sub6 RF signal into a baseband signal to be processed by the corresponding communication processor among the first communication processor 212 or the second communication processor 214.

The third RFIC 226 may convert a baseband signal generated by the second communication processor 214 into an RF signal (hereinafter, referred to as a 5G Above6 RF signal) in a 5G Above6 band (for example, from about 6 to about 60 GHz) used by the second cellular network 294 (for example, 5G network). In reception, a 5G Above6 RF signal may be acquired from the second cellular network 294 (for example, 5G network) through an antenna (for example, the antenna 248) and may be preprocessed through the third RFFE 236. The third RFIC 226 may convert the preprocessed 5G Above6 RF signal into a baseband signal to be processed by the second communication processor 214. According to an embodiment, the third RFFE 236 may be configured as a part of the third RFIC 226.

The electronic device 101 may include the fourth RFIC 228 separately from the third RFIC 226 or as a part thereof according to an embodiment. In this case, after converting a baseband signal generated by the second communication processor 214 into an RF signal (hereinafter, referred to as an IF signal) in an intermediate frequency band (for example, about 9 GHz to about 11 GHz), the fourth RFIC 228 may transmit the IF signal to the third RFIC 226. The third RFIC 226 may convert the IF signal into a 5G Above6 RF signal. In reception, a 5G Above6 RF signal may be received from the second cellular network 294 (for example, 5G network) through an antenna (for example, antenna 248) and converted into an IF signal by the third RFIC 226. The fourth RFIC 228 may convert the IF signal into a baseband signal to be processed by the second communication processor 214.

According to an embodiment, the first RFIC 222 and the second RFIC 224 may be implemented as at least a part of a single chip or a single package. According to various embodiments, when the first RFIC 222 and the second RFIC 224 are implemented as a single chip or a single package in FIG. 2A or FIG. 2B, they may be implemented as an integrated RFIC. In this case, the integrated RFIC may be connected to the first RFFE 232 and the second RFFE 234 to convert a baseband signal into a signal in a band supported by the first RFFE 232 and/or the second RFFE 234 and transmit the converted signal to one of the first RFFE 232 and the second RFFE 234. According to an embodiment, at least one of the first antenna module 242 or the second antenna module 244 may be omitted or may be connected to another antenna module to process RF signals in a plurality of corresponding bands.

According to an embodiment, the third RFIC 226 and the antenna 248 may be disposed on the same substrate to form the third antenna module 246. For example, the wireless communication module 192 or the processor 120 may be disposed on a first substrate (for example, main PCB). In this case, the third RFIC 226 may be disposed in a partial area (for example, bottom side) of a second substrate (for example, sub PCB) separated from the first substrate and the antennas 248 may be disposed in another partial area (for example, top side) to configure the third antenna module 246. By disposing the third RFIC 226 and the antennas 248 on the same substrate, it is possible to reduce the length of a transmission line therebetween. This is to reduce loss (for example, attenuation) of the signal in a high frequency band (for example, about 6 GHz to about 60 GHz) used for, for example, 5G network communication due to the transmission line. Accordingly, the electronic device 101 may improve a quality or a speed of communication with the second cellular network 294 (for example, 5G network).

According to an embodiment, the antennas 248 may be configured as an antenna array including a plurality of antennal elements which can be used for beamforming. In this case, the third RFIC 226 may include, for example, a plurality of phase shifters 238 corresponding to the plurality of antenna elements as a part of the third RFFE 236. In transmission, each of the plurality of phase shifters 238 may convert a phase of a 5G Above6 RF signal to be transmitted to the outside of the electronic device 101 (for example, a base station of the 5G network) through a corresponding antenna element. In reception, each of the plurality of phase shifters 238 may convert the phase of the 5G Above6 RF signal received from the outside through the corresponding antenna element into the same phase or substantially the same phase. This enables transmission or reception through beamforming between the electronic device 101 and the outside.

The second cellular network 294 (for example, 5G network) may operate independently from the first cellular network 292 (for example, legacy network) (for example, Stand-Alone (SA)) or operate through a connection to thereto. For example, in the 5G network, only an access network (for example, a 5G Radio Access Network (RAN) or a Next Generation RAN (NG RAN)) may exist without a core network (for example, a Next Generation Core (NGC)). In this case, the electronic device 101 may access the access network of the 5G network and then access an external network (for example, Internet) under the control of the core network (for example, Evolved Packed Core (EPC) of the legacy network). Protocol information (for example, LTE protocol information) for communication with the legacy network and protocol information (for example, NR protocol information) for communication with the 5G network may be stored in the memory 130 and may be accessed by another element (for example, the processor 120, the first communication processor 212, or the second communication processor 214).

Figure 3A:
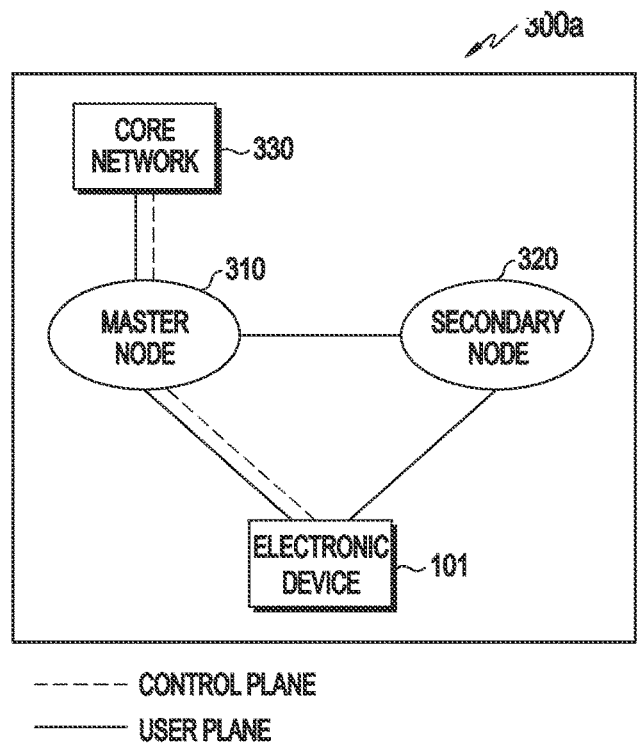
FIG. 3A is a diagram illustrating wireless communication systems providing a network of legacy communication and/or 5G communication according to an embodiment of the disclosure.
Figure 3B:
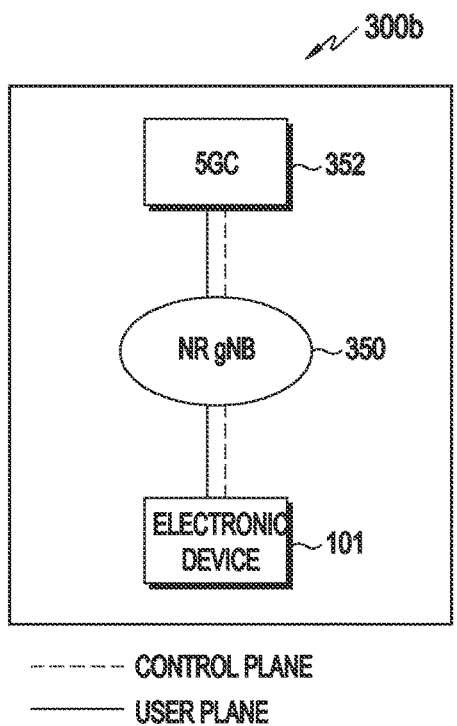
FIG. 3B is a diagram illustrating wireless communication systems providing a network of legacy communication and/or 5G communication according to an embodiment of the disclosure.
Figure 3C:
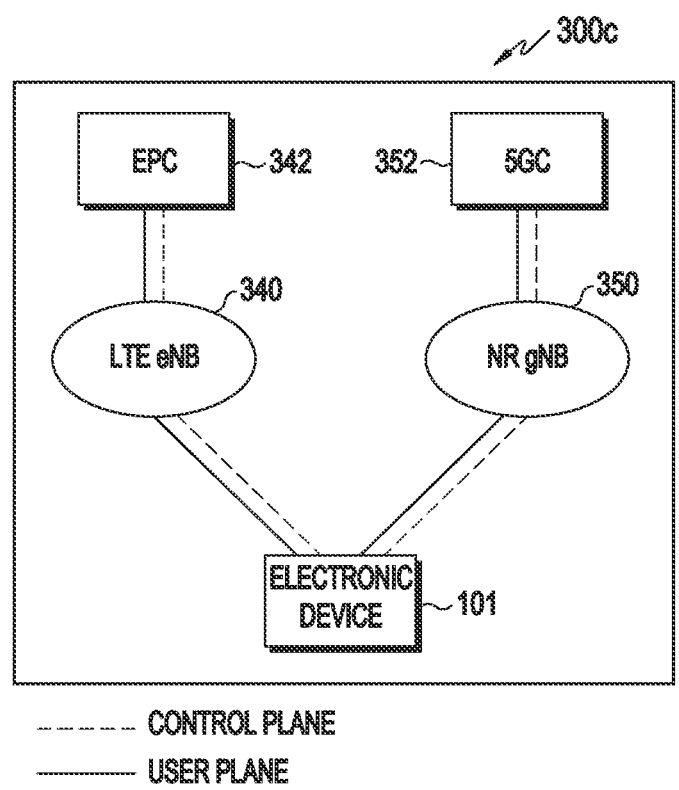
FIG. 3C is a diagram illustrating wireless communication systems providing a network of legacy communication and/or 5G communication according to an embodiment of the disclosure.

FIGS. 3A, 3B, and 3C are diagrams illustrating wireless communication systems that provide the network of legacy communication and/or 5G communication according to various embodiments.

Referring to FIGS. 3A, 3B, and 3C, network environments 300a, 300b, and 300c may include at least one of the legacy network and the 5G network. The legacy network may include, for example, a 4G or LTE eNB 340 (for example, an evolved Node B (eNodeB or eNB)) of the 3GPP standard supporting radio access with the electronic device 101 and an evolved packet core (EPC) 342 for managing 4G communication. The 5G network may include, for example, an NR base station 350 (for example, a next generation Node B (gNodeB or gNB)) supporting radio access with the electronic device 101 and a $5^{th}$ Generation Core (5GC) 352 for managing 5G communication of the electronic device 101.

According to various embodiments, the electronic device 101 may transmit and receive a control message and user data through legacy communication and/or 5G communication. The control message may include, for example, a control message related to at least one of security control of the electronic device 101, bearer setup, authentication, registration, or mobility management. The user data may be, for example, user data other than a control message transmitted and received between the electronic device 101 and a core network 330 (for example, the EPC 342).

FIG. 3A is a diagram illustrating wireless communication systems providing a network of legacy communication and/or 5G communication according to an embodiment of the disclosure.

Referring to FIG. 3A, the electronic device 101 according to an embodiment may transmit and receive at least one of a control message or user data to and from at least some of the 5G network (for example, the NR gNB 350 and the 5GC 352) using at least some of the legacy network (for example, the LTE eNB 340 and the EPC 342).

According to various embodiments, the network environment 300a may include a network environment for providing wireless communication Dual Connectivity (DC) to the LTE eNB 340 and the NR gNB 350 and transmitting and receiving a control message to and from the electronic device 101 through one core network 230 of the EPC 342 or the 5GC 352.

According to various embodiments, in the DC environment, one of the LTE eNB 340 or the NR gNB 350 may operate as a Master Node (MN) 310, and the other may operate as a Secondary Node (SN) 320. The MN 310 may be connected to the core network 230 and transmit and receive a control message. The MN 310 and the SN 320 may be connected through a network interface and may transmit and receive a message related to management of radio resources (for example, communication channels) to and from each other.

According to various embodiments, the MN 310 may include the LTE eNB 340, the SN 320 may include the NR gNB 350, and the core network 330 may include the EPC 342. For example, the control message may be transmitted and received through the LTE gNB 340 and the EPC 342, and the user data may be transmitted and received through at least one of the LTE eNB 340 or the NR gNB 350.

According to various embodiments, the MN 310 may include the NR gNB 350, the SN 320 may include the LTE eNB 340, and the core network 330 may include the 5GC 352. For example, the control message may be transmitted and received through the NR gNB 350 and the 5GC 352, and the user data may be transmitted and received through at least one of the LTE eNB 340 or the NR gNB 350.

FIG. 3B is a diagram illustrating wireless communication systems providing a network of legacy communication and/or 5G communication according to an embodiment of the disclosure.

Referring to FIG. 3B, according to various embodiments, the 5G network may include the NR gNB 350 and the 5GC 352 and may independently transmit and receive the control message and the user data to and from the electronic device 101.

FIG. 3C is a diagram illustrating wireless communication systems providing a network of legacy communication and/or 50 communication according to an embodiment of the disclosure.

Referring to FIG. 3C, the legacy network and the 5G network according to various embodiments may independently transmit and receive data. For example, the electronic device 101 and the EPC 342 may transmit and receive a control message and user data through the LTE eNB 340. According to another embodiment, the electronic device 101 and the 5GC 352 may transmit and receive a control message and user data through the NR gNB 350.

According to various embodiments, the electronic device 101 may be registered in at least one of the EPC 342 or the 5GC 352 and transmit and receive a control message.

According to various embodiments, the EPC 342 or the 5GC 352 may interwork and manage communication of the electronic device 101. For example, movement information of the electronic device 101 may be transmitted and received through an interface (not shown, for example, N26 interface) between the EPC 342 and the 5GC 352.

As described above, the dual connection through the LTE eNB 340 and the NR gNB 350 may be also named E-UTRA New radio Dual Connectivity (EN-DC).

Dynamic Spectrum Sharing (DSS) may be a technology that allows different wireless communication technologies (for example, an LTE communication scheme and an NR communication scheme) to be used in the same frequency band. For example, according to DSS, the same frequency resources may be dynamically allocated to LTE communication network data or NR communication network data, so that respective electronic devices supporting LTE and NR may share resources in the same frequency and all receive the service.

In various embodiments described below, when DSS is applied and data of the NR communication scheme is transmitted and received in a frequency band allocated for LTE, a method of expecting or identifying a slot (or subframe) (for example, a non-Multimedia Broadcast multicast service Single Frequency Network (MBSFN) subframe) which is not used for NR resource allocation and controlling the corresponding slot (or subframe) to operate in a sleep state is described. Various embodiments described below are not limited to a specific communication scheme (for example, the NR communication scheme or the LTE communication scheme) and may be applied to any communication technology to which DSS is applied in which data corresponding to a first communication network and data corresponding to a second communication network share and use the same frequency band. For example, the various embodiments may be equally or similarly applied not only to DSS by the NR communication scheme and the LTE communication scheme but also to DSS by the LTE communication scheme and a 3G communication scheme or DSS by a 6G communication scheme and a 5G NR communication scheme.

FIGS. 4A, 4B, 4C, 4D, and 4E are diagrams illustrating a concept of DSS according to various embodiments of the disclosure.

Figure 4A:
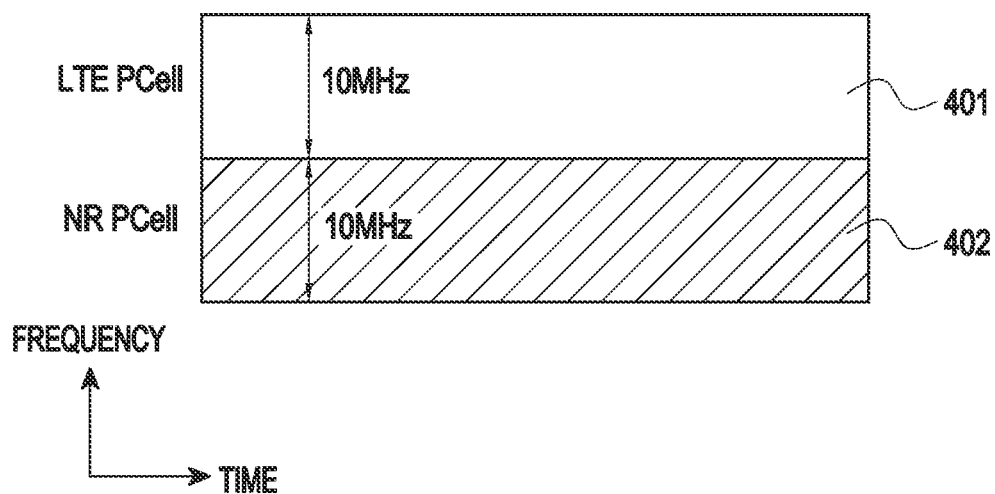
FIG. 4A is a diagram illustrating a concept of Dynamic Spectrum Sharing (DSS) in a frequency division multiplexing scheme according to an embodiment of the disclosure.

FIG. 4A is a diagram illustrating the concept of DSS in a Frequency Division Multiplexing (FDM) scheme according to an embodiment of the disclosure.

Figure 4B:
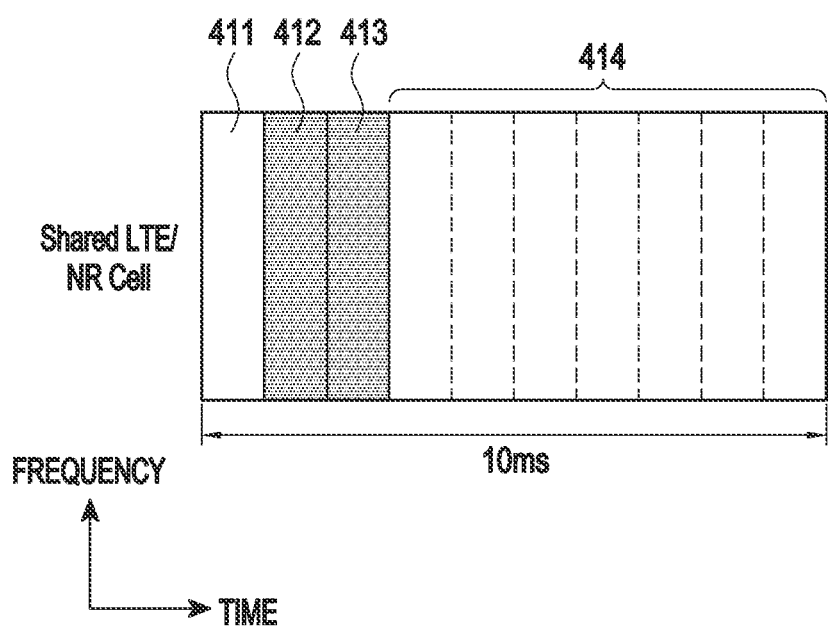
FIG. 4B is a diagram illustrating a concept of DSS in a time division multiplexing scheme according to an embodiment of the disclosure.

FIG. 4B is a diagram illustrating the concept of DSS in a Time Division Multiplexing (TDM) scheme according to an embodiment of the disclosure.

Referring to FIG. 4A, at least a portion of a frequency area 402 may be used for the first communication network (for example, NR communication network) and the remaining frequency area 401 may be used for the second communication network (for example, LTE communication network) through the application of DSS to a frequency band operated for the second communication network (for example, LTE communication network). For example, when it is assumed that the frequency bandwidth operated for the second communication network is 20 MHz, 10 MHz may be used for transmitting and receiving data corresponding to the first communication network and the remaining 10 MHz may be used for transmitting and receiving data corresponding to the second communication network. When DSS is applied to the frequency band, the electronic device (for example, the electronic device 101 of FIG. 1) operating in NR may access an NR gNB (NR primary cell (PCell)) to transmit and receive data through the frequency area 402 used for transmitting and receiving data corresponding to the NR communication network, and the electronic device operating in LTE may access an LTE eNB (LTE PCell) to transmit and receive data through the frequency area 401 used for transmitting and receiving data corresponding to the LTE communication network, According to various embodiments, when DSS is applied, the size of the frequency area allocated for the NR communication network may be dynamically controlled according to the time (for example, in units of subframes) in 20 MHz that is the entire frequency bandwidth operated for the LTE communication network. For example, in 20 MHz that is the entire frequency bandwidth, 10 MHz may be allocated for the size of the frequency area used for the NR communication network at a first time point and 8 MHz may be allocated at a second time point. According to another embodiment, all of 20 MHz that is the entire frequency bandwidth may be used for the LTE communication network at the first time point, and a frequency area of 10 MHz in the entire frequency bandwidth 20 MHz may be used for the NR communication network.

Referring to FIG. 4B, at least some subframes 412 and 413 may be used for the first communication network (for example, NR communication network) and the remaining subframes 411 and 414 may be used for the second communication network (for example, LTE communication network) through the application of DSS to a radio frame operated for the second communication network (for example, LTE communication network).

For example, when it is assumed that the time of one radio frame is 10 ms and one radio frame includes 10 subframes, the time of one subframe may be 1 ms. Referring to FIG. 4B, when it is assumed that one radio frame includes a $0^{th}$ subframe to a $9^{th}$ subframe from the left side to the right side, LTE communication network data may be transmitted and received in the $0^{th}$ subframe 411, NR communication network data may be transmitted and received in a $1^{st}$ subframe 412 and a $2^{nd}$ subframe 413, and LTE communication network data may be transmitted and received in the remaining $3^{rd}$ to $9^{th}$ subframes 414.

According to various embodiments, when DSS in the time division multiplexing scheme is operated as illustrated in FIG. 4B, NR communication network data may be transmitted using an MBSFN subframe configured for MBSFN. For example, when a $1^{st}$ subframe 412 and the $2^{nd}$ subframe 413 are configured as MBSFN subframes, the base station (for example, eNB) corresponding to the LTE communication network may transmit broadcast service data through the $1^{st}$ subframe 412 and the $2^{nd}$ subframe 413 configured as the MBSFN subframes or may not transmit any data. According to various embodiments, the base station (for example, eNB) corresponding to the LTE communication network may transmit LTE communication network data using the remaining subframes 411 and 414 expect for the $1^{st}$ subframe 412 and the $2^{nd}$ subframe 413 configured as the MBSFN subframes.

According to various embodiments, when the base station (for example, eNB) corresponding to the LTE communication network does not transmit broadcast service data through the $1^{st}$ subframe 412 and the $2^{nd}$ subframe 413 configured as the MBSFN subframes or does not transmit any data, DSS in the time division multiplexing scheme may be applied through the use of the $1^{st}$ subframe 412 and the $2^{nd}$ subframe 413 as subframes for NR communication network data transmission. According to various embodiments, the base station (for example, gNB) corresponding to the NR communication network may transmit NR communication network data through the $1^{st}$ subframe 412 and the $2^{nd}$ subframe 413 which are configured as the MBSFN subframes and are not used by the eNB of the LTE communication network. According to various embodiments, the base station (for example, gNB) corresponding to the NR communication network may transmit NR communication network data in at least one subframe in which LTE communication network data is not transmitted among the $0^{th}$ subframe 411 and the $4^{th}$ to $9^{th}$ subframes 414 which are not configured as the MBSFN subframes and are allocated for the use by the eNB of the LTE communication network.

Figure 4C:
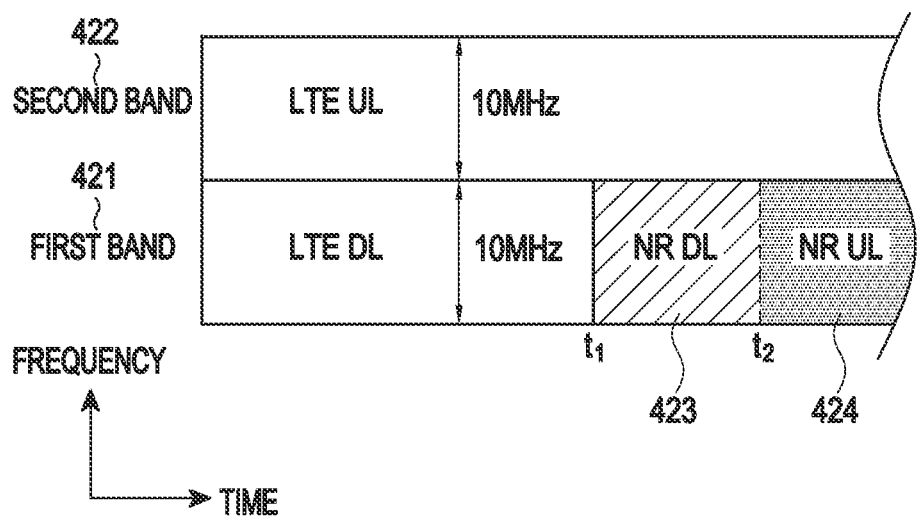
FIG. 4C is a diagram illustrating a concept of DSS according to an embodiment of the disclosure.
Figure 4D:
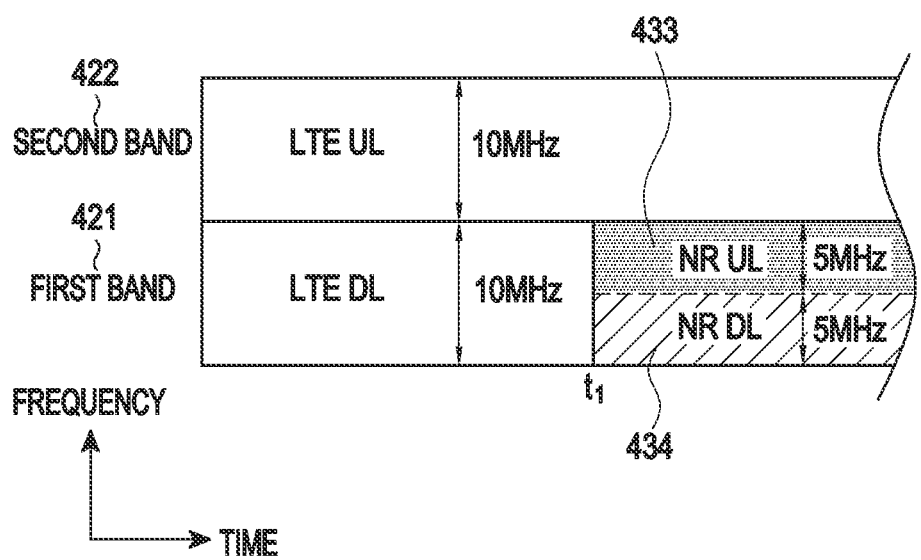
FIG. 4D is a diagram illustrating a concept of DSS according to an embodiment of the disclosure.

According to various embodiments, referring to FIGS. 4C and 4D, DSS may be applied to one band (for example, a first band 421 for downlink transmission and a second band 422 for uplink transmission) among frequency bands (for example, the first band 421 for downlink transmission and the second band 422 for uplink transmission) operated for the second communication network (for example, LTE communication network). For example, the first band 421 allocated as a downlink band of the second communication network may be used as the downlink band (LTE DL) of the second communication network before a time point $t_1$, and all or at least a part of the first band 421 may be used for data transmission of the first communication network (for example, NR communication network) after the time point $t_1$. For example, the second band 422 allocated as an uplink band of the second communication network (for example, LTE communication network) may be used as the uplink band (LTE UL) of the second communication network (for example, LTE communication network) before the time point $t_1$, and all or at least a part of the second band 422 may be used for data transmission of the first communication network (for example, NR communication network) after the time point $t_1$.

According to various embodiments, the first band 421 allocated as the downlink band of the second communication network (for example, LTE communication network) may be used as the downlink band (LTE DL) of the second communication network (for example, LTE communication network) before the time point $t_1$, all or at least a part of the first band 421 may be used for data transmission of the first communication network (for example, NR DL) after the time point $t_1$, the second band 422 allocated as the uplink band of the second communication network (for example, LTE communication network) may be used the uplink band (LTE UL) of the second communication network (for example, LTE communication network) before the time point $t_1$, and all or at least a part of the second band 422 may be used for data transmission of the first communication network (for example, NR UL) after the time point $t_1$.

FIG. 4C is a diagram illustrating a concept of DSS according to an embodiment of the disclosure.

Referring to FIG. 4C, data of the first communication network (for example, NR communication network) may be transmitted through a TDD scheme in the first band 421 after the time point $t_1$. For example, the first band 421 may be used as a downlink band (NR DL) 423 of the first communication network from the time point $t_1$ to a time point $t_2$ and used as an uplink band (NR UL) 424 of the first communication network from the time point $t_2$.

FIG. 4D is a diagram illustrating a concept of DSS according to an embodiment of the disclosure.

Referring to FIG. 4D, data of the first communication network (for example, NR communication network) may be transmitted through a FDD scheme in the first band 421 after the time point $t_1$. For example, some (for example, 5 MHz) of the first band 421 may be used as a downlink band (NR DL) 433 of the first communication network from the time point $t_1$, and the remaining band (for example, 5 MHz) of the first band 421 may be used as an uplink band (NR UL) 434 of the first communication network.

Figure 4E:
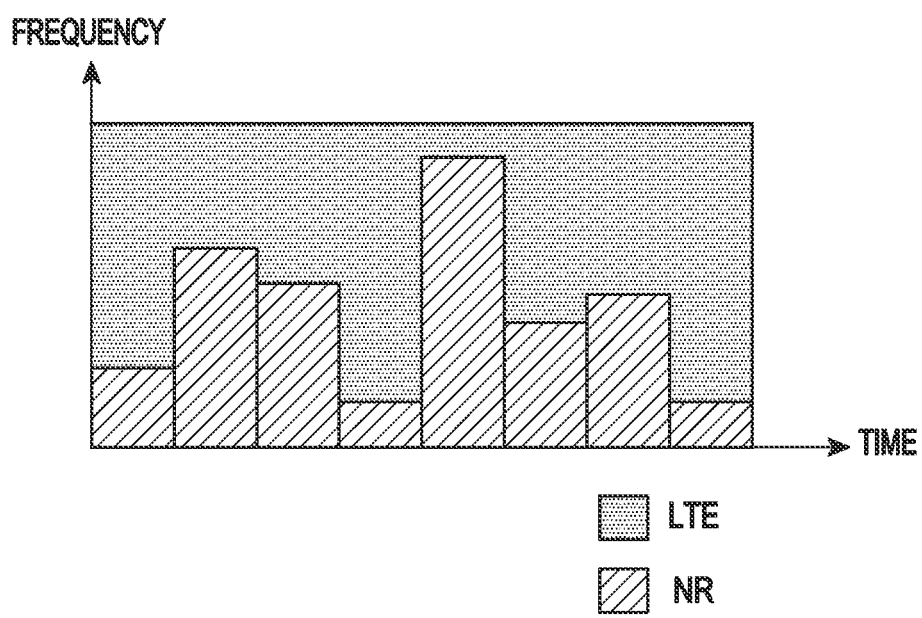
FIG. 4E is a diagram illustrating a concept of DSS according to an embodiment of the disclosure.

FIG. 4E is a diagram illustrating a concept of DSS according to an embodiment of the disclosure.

Referring to FIG. 4E, at least some of the entire frequency bands allocated for the second communication network (LTE) may be used for data transmission of the first communication network (NR). The size of resources (for example, Resource Block (RB)) allocated for data of the first communication network (NR) may be changed according to the time as illustrated in FIG. 4E. For example, the electronic device or the base station may change the size of the resources allocated for data of the first communication network (NR) in units of predetermined times (for example, every slot or every subframe (for example, according to a period of 1 ms) or according to a scheduling period of the base station, but is not limited thereto.

According to various embodiments, the size or the location of resources allocated for data of the first communication network (NR) may be changed in units of symbols (for example, $\frac{1}{14}$ ms in the case of a normal Cyclic Prefix (CP) and $\frac{1}{12}$ ms in the case of an extended CP). According to various embodiments, resources allocated for data of the first communication network (NR) may be differently allocated for each subcarrier, resource block, or resource element for the same symbol, the same subframe, or the same time interval in FIG. 4E.

Figure 5A:
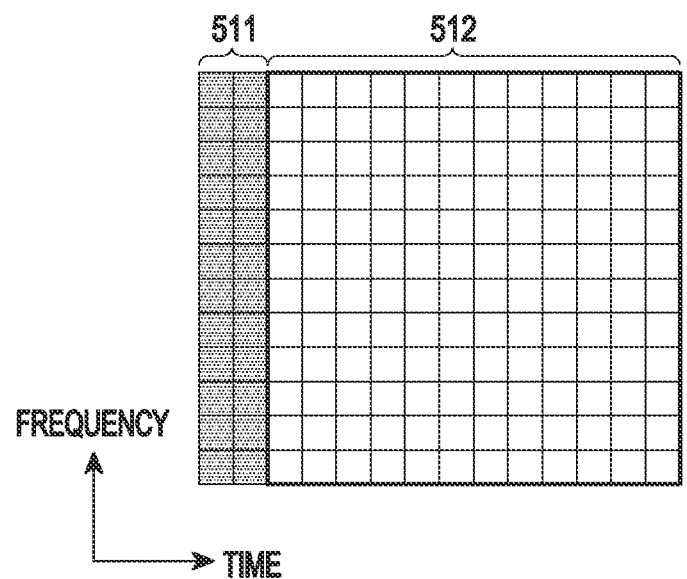
FIG. 5A is a diagram illustrating a structure of a Multimedia Broadcast multicast service Single Frequency Network (MBSFN) subframe to which DSS is applied according to an embodiment of the disclosure.

FIG. 5A is a diagram illustrating a structure of an MBSFN subframe to which DSS is applied according to an embodiment of the disclosure.

Referring to FIG. 5A, the electronic device 101 may transmit and receive data of the NR communication system using a Multi-broadcast Single-Frequency Network (MBSFN) area (or MBSFN subframe) defined to use an evolved Multimedia Broadcast Multicast Services (eMBMS) in the LTE communication system. According to various embodiments, one MBSFN subframe may include a total of 14 symbols in the time axis. In the MBSFN subframe, a first area 511 including first two symbols may be configured as an area for LTE CRS and Physical Downlink Control Channel (PDCCH) data transmission, and a second area 512 including the remaining 12 symbols is an area allocated for the eMBMS and may be configured as an area for data transmission and reception of the NR communication system.

Figure 5B:
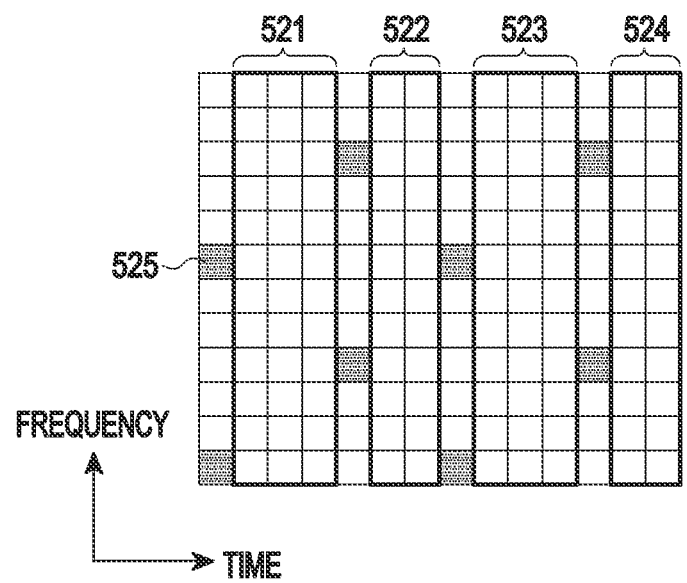
FIG. 5B is a diagram illustrating a structure of a non-MBSFN subframe to which DSS is applied according to an embodiment of the disclosure.

FIG. 5B is a diagram illustrating a structure of a non-MBMS subframe to which DSS is applied according to an embodiment of the disclosure.

Referring to FIG. 5B, the electronic device 101 may transmit and receive data of the NR communication system using a non-MBSTN area (or non-MBSFN subframe) which is not the Multi-broadcast Single-Frequency Network (MBSFN) area (or MBSFN subframe) of FIG. 5B defined in the LTE communication system. According to various embodiments, one non-MBSFN subframe may include a total of 14 symbols in the time axis. In the non-MBSFN subframe, some Resource Elements (REs) 525 among $0^{th}$, $4^{th}$, $7^{th}$, and $11^{th}$ symbols may be allocated to transmit LTE CRS data. In the NR communication system, NR communication system data may be transmitted and received through the remaining symbols (for example, $1^{st}$ to $3^{rd}$, $5^{th}$, $6^{th}$, $8^{th}$ to $10^{th}$, $12^{th}$, and $13^{th}$ symbols) except for the symbols (for example, $0^{th}$, $4^{th}$, $7^{th}$, and $11^{th}$ symbols) for transmitting the LTE CRS data. The symbols for transmitting and receiving the NR communication system data may include four areas 521, 522, 523, and 524, and each area may be allocated to transmit and receive NR communication system data in the form of mini-slots. For example, in the NR communication system, data for an Ultra-Reliable and Low-Latency Communications (URLLC) service that requires a relatively short delay time may be transmitted and received using the mini-slots.

Figure 5C:
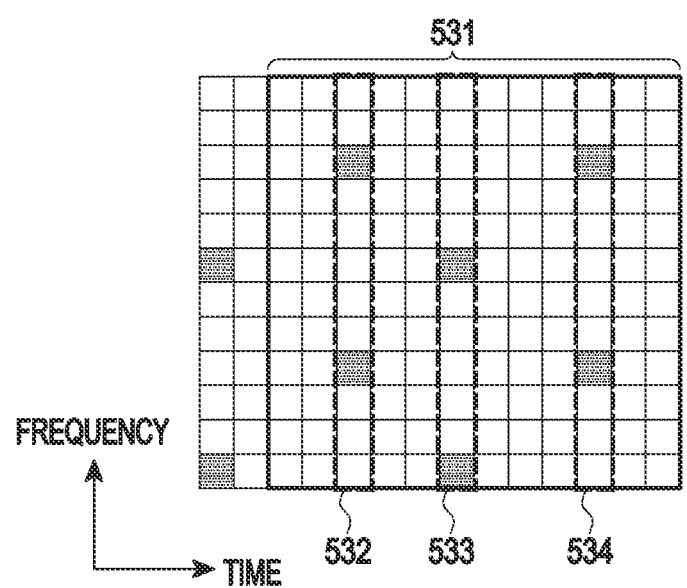
FIG. 5C is a diagram illustrating a structure of the non-MBSFN subframe to which DSS is applied according to an embodiment of the disclosure.

FIG. 5C is a diagram illustrating a structure of the non-MBSFN subframe to which DSS is applied according to an embodiment of the disclosure.

Referring to FIG. 5C, the electronic device 101 may transmit and receive data of the NR communication system using a non-MBSFN area (or non-MBSFN subframe) which is not the Multi-broadcast Single-Frequency Network (MBSFN) area (or MBSFN subframe) of FIG. 5C defined in the LTE communication system. According to various embodiments, one non-MBSFN subframe may include a total of 14 symbols in the time axis. In the non-MBSFN subframe, $0^{th}$ and $1^{st}$ symbols may be allocated to transmit LTE control channel data. According to various embodiments, $2^{nd}$ to $13^{th}$ symbols may be configured as an area 531 for transmitting and receiving NR communication system data. Since the LTE CRS may be transmitted in some REs of some symbols (for example, $4^{th}$ symbol 532, $7^{th}$ symbol 533, and $11^{th}$ symbol 534) in the area 531 for transmitting and receiving the NR communication system data, LTE data and NR data may overlap each other and may be transmitted in the corresponding symbols 532, 533, and 534. The electronic device 101 may apply CRS rate matching in the symbols 532, 533, and 534 in which the LTE data and the NR data overlap and are transmitted. For example, the electronic device 101 may puncture each RE used for the LTE CRS in the symbols 532, 533, and 534 in which the LTE data and the NR data overlap and are transmitted, and accordingly, identify the RE used for the LTE CRS in advance when decoding PDSCH data to exclude the RE from the decoding.

According to various embodiments, the DSS schemes of FIGS. 5A, 5B, and 5C may be selectively used. For example, the DSS scheme using the MBSFN scheme of FIG. 5A may be necessarily used for NR SSB allocation, and the DSS scheme using the non-MBSFN subframe of FIGS. 5B and 5C may be additionally used as necessary.

According to various embodiments, when the electronic device 101 transmits and receives data of the NR communication system through the DSS scheme using the non-MBSFN subframe of FIGS. 5B and 5C, the electronic device may receive information on the MBSFN area and information on the LTE CRS location from the base station for LTE CRS rate matching as described above. For example, the information on the LTE CRS information may be configured as shown in Table 1 below and the information on the MBSFN area may be configured as shown in Table 2 below on the basis of the 3GPP standard document 38.331.

TABLE 1

```
RateMatchPatternLTE-CRS ::= SEQUENCE {
carrierFreqDL           INTEGER (0..16383),
carrierBandwidthDL ENUMERATED {n6, n15, n25, n50, n75, n100,
spare2, spare1},
mbsfn-SubframeConfigList EUTRA-MBSFN-SubframeConfigList
OPTIONAL, -- Need M
nrofCRS-Ports           ENUMERATED {n1, n2, n4},
   v-Shift              ENUMERATED {n0, n1, n2, n3, n4, n5}
}
```

TABLE 2

```
EUTRA-MBSFN-SubframeConfigList ::= SEQUENCE (SIZE
(1..maxMBSFN-Allocations)) OF EUTRA-MBSFN-SubframeConfig
EUTRA-MBSFN-SubframeConfig ::= SEQUENCE {
radioframeAllocationPeriod ENUMERATED {n1, n2, n4, n8, n16, n32},
radioframeAllocationOffset INTEGER (0..7),
   subframeAllocation1     CHOICE {
oneFrame                BIT STRING (SIZE(6)),
fourFrames              BIT STRING (SIZE(24))
   },
   subframeAllocation2     CHOICE {
oneFrame                BIT STRING (SIZE(2)),
fourFrames              BIT STRING (SIZE(8))
}                        OPTIONAL, -- Need R
...
```

According to various embodiments, when the electronic device 101 transmits and receives data of the NR communication system using only the DSS scheme using the MBSFN subframe of FIG. 5A, LTE CRS rate matching is not needed, and thus the information an the MBSFN area and the information on the LTE CRS location may not be received from the base station. As the electronic device 101 does not receive the information on the MBSFN area and the information on the LTE CRS location from the base station, the electronic device does not know the location of the MBSFN subframe and may monitor downlink control data up to the non-MBSFN subframe rather than the MBSFN subframe. In various embodiments described above, the electronic device 101 transmitting and receiving data through the MBSFN-based DSS technology illustrated in FIG. 5A may expect or identify a slot (or subframe) (for example, non-MBSFN subframe) which is not used for NR resource allocation and control the corresponding slot (or subframe) to operate in a sleep state.

Figure 6A:
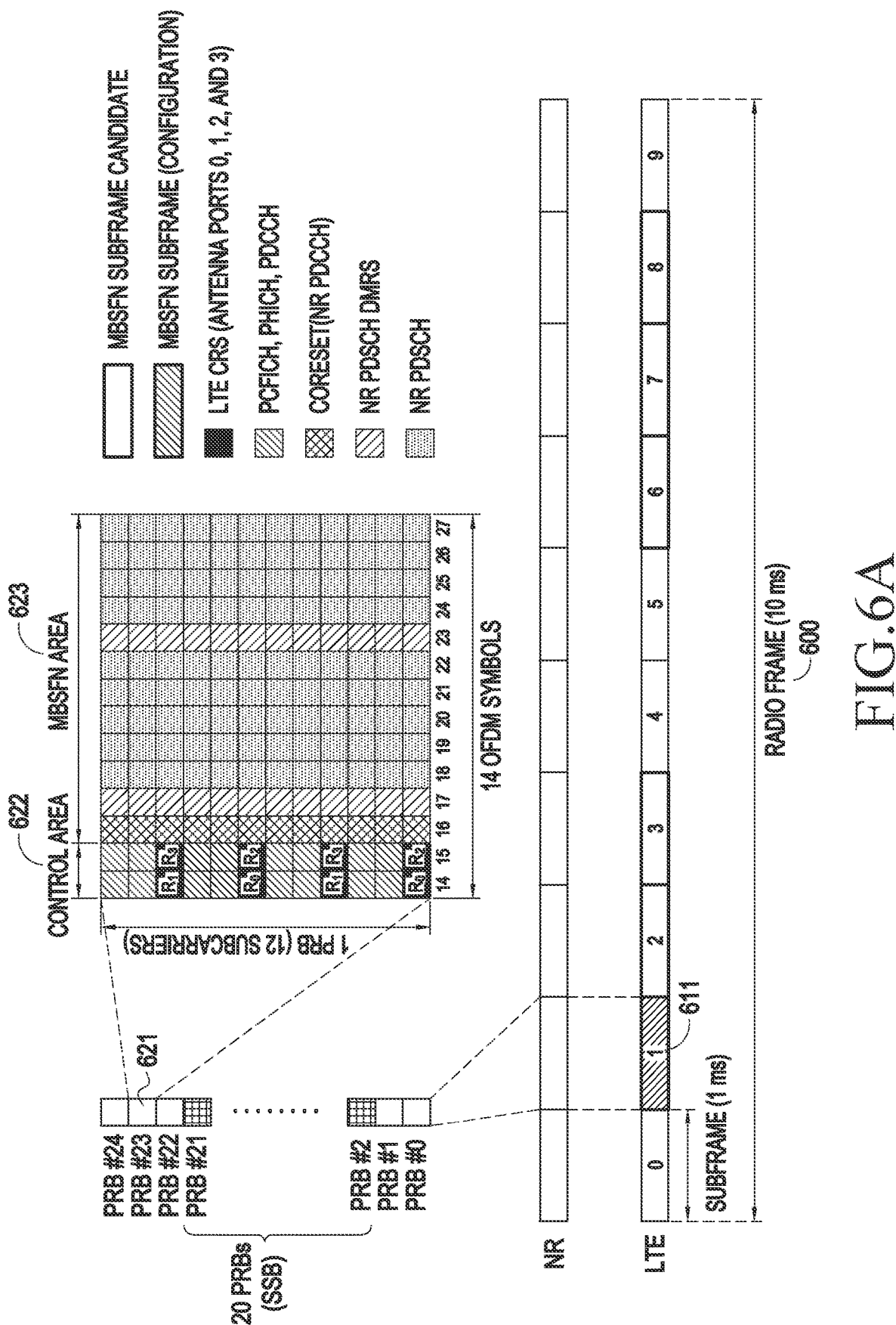
FIG. 6A is a diagram illustrating a structure of an MBSFN subframe to which DSS is applied according to an embodiment of the disclosure.
Figure 6B:
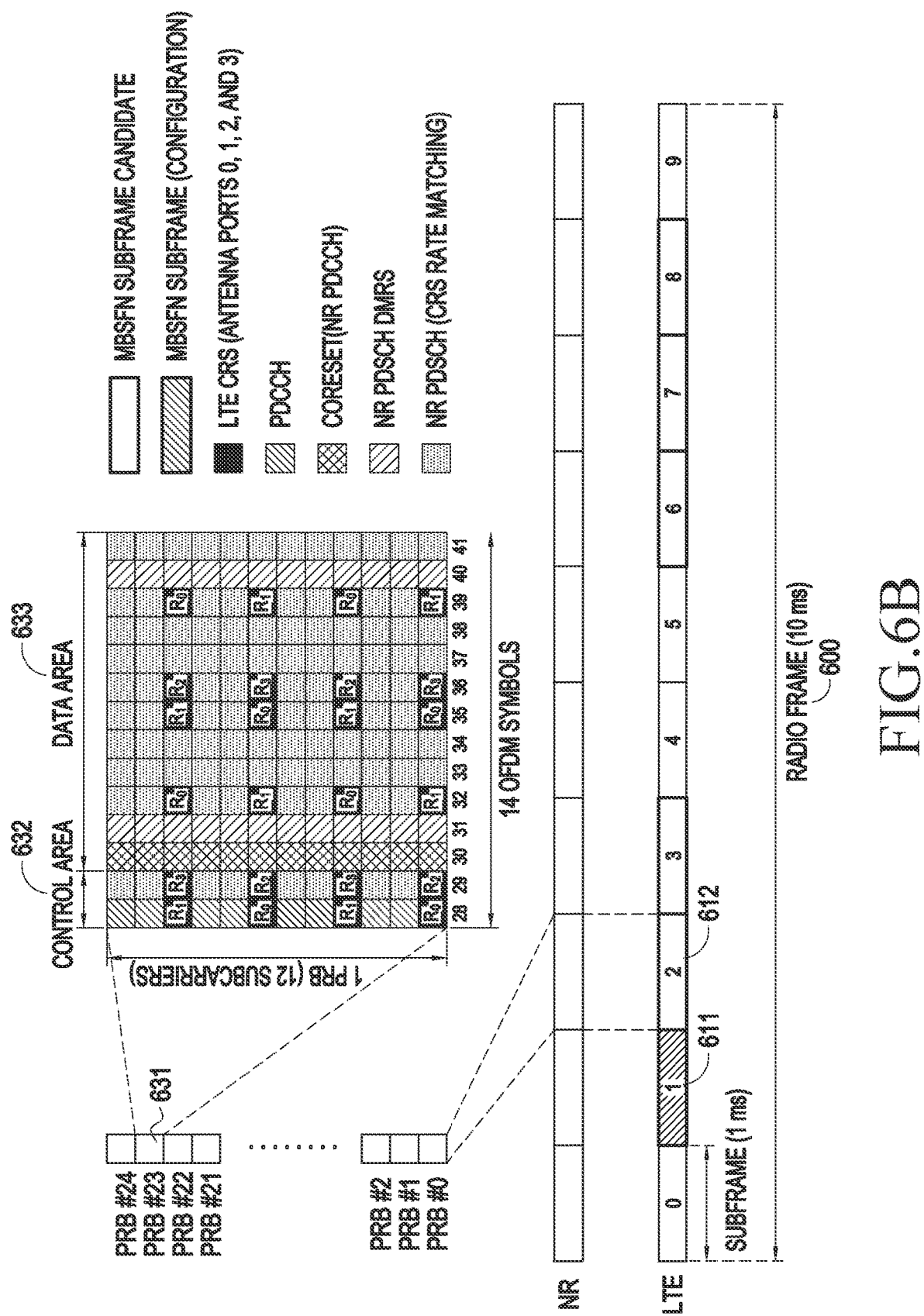
FIG. 6B is a diagram illustrating a structure of a non-MBSFN subframe to which DSS is applied according to an embodiment of the disclosure.

Hereafter, examples of a more detailed configuration of subframes according to the DSS schemes in FIGS. 5A, 5B, and 5C are described with reference to FIGS. 6A and 6B. FIG. 6A or 6B described below is an example of the DSS scheme related to FIG. 4B or 4E, and embodiments described below are not limited to the above scheme and may be equally or similarly applied to the scheme in FIG. 4A, 4C, or 4D.

FIG. 6A is a diagram illustrating the structure of the MBSFN subframe to which DSS is applied according to an embodiment of the disclosure.

FIG. 6B is a diagram illustrating a structure of a non-MBSFN subframe to which DSS is applied according to an embodiment of the disclosure.

Referring to FIGS. 6A and 6B, one radio frame 600 may include 10 subframes. When it is assumed that one radio frame 600 is 10 ms, each subframe may be 1 ms. It may be assumed that the radio frame 600 is a radio frame configured in accordance with the LTE communication network. According to various embodiments, at least one of the 10 subframes included in the one radio frame 600 may be configured as the MBSFN subframe.

According to various embodiments, information on the MBSFN subframe may be broadcasted by a base station (for example, LTE eNB) through System Information Block (SIB) 2, and the electronic device 101 may receive information on the MBSFN subframe regardless of whether the broadcast service (for example, eMBMS) is supported. For example, SIB 2 may include MBSFN subframe information element (MBSFN-SubframeConfig information element) as shown in Table 3 below.

TABLE 3

```
MBSFN-SubframeConfig information element
MBSFN-Subframeconiig ::= SEQUENCE {
radioframeAllocationPeriod ENUMERATED {n1, n2, n4, n8, n16, n32},
radioframeAllocationOffset INTEGER {0..7}
subframeAllocation              CHOICE {
oneFrame                        BIT STRING (SIZE(6)),
fourFrames                      BIT STRING (SIZE(24))
  }
}
MBSFN-Subframeconfig-v1430 ::= SEQUENCE {
   subframeAllocation-v1430     CHOICE {
      oneFrame-v1430            BIT STRING (SIZE(2)),
      fourFrames-v1430          BIT STRING (SIZE(8))
   }
}
```

According to various embodiments, it is noted that referring to FIGS. 6A and 6B, $1^{st}$, $2^{nd}$, $3^{rd}$, $6^{th}$, $7^{th}$, and $8^{th}$ subframes of the radio frame 600 are candidates which can be configured as the MBSFN subframes. According to various embodiments, $1^{st}$, $2^{nd}$, $3^{rd}$, $6^{th}$, $7^{th}$, and $8^{th}$ subframes of the radio frame 600 may be configured as MBSFN subframe candidates when the electronic device 101 operates in a Frequency Division Duplex (FDD) mode, and $2^{nd}$, $3^{rd}$, $4^{th}$, $7^{th}$, $8^{th}$, and $9^{th}$ subframes of the radio frame 600 may be configured as MBSFN subframe candidates when the electronic device 101 operates in a Time Division Duplex (TDD) mode.

FIGS. 6A and 6B illustrate the case of the FDD mode, and it is noted that the first subframe of the $1^{st}$, $2^{nd}$, $3^{rd}$, $6^{th}$, $7^{th}$, and $8^{th}$ subframes which are the MBSFN subframes is configured as the MBSFN subframe. Configuration information of the MBSFN subframes may be identified through SIB2 transmitted by the base station as described above.

According to various embodiments, FIG. 6A illustrates an example of the configuration of the corresponding subframe when NR communication network data is allocated to the MBSFN subframe and DSS is operated, and FIG. 6B illustrates an example of the configuration of the corresponding subframe when NR communication network data is applied to the non-MBSFN subframe which is not configured as the MBSFN subframe and DSS is operated. Although FIG. 6B below describes the structure of the subframe which is not configured as the MBSFN subframe in MBSFN subframe candidates, the same or similar application may be perform for a general LTE subframe (for example, $0^{th}$, $4^{th}$, $5^{th}$, and $9^{th}$ subframe, or each subframe of a radio frame which is not the radio frame 600) which is not the MBSFN subframe candidate.

First, referring to FIG. 6A, when the $1^{st}$ subframe 611 is configured as the MBSFN subframe, the MBSFN subframe may be configured as a control area 622 and an MBSFN area 623 as illustrated. In the MBSFN subframe illustrated in FIG. 6A, the horizontal axis may correspond to the time axis and the vertical axis may correspond to the frequency axis. One MBSFN subframe may include 14 OFDM symbols in the horizontal axis. The one MBSFN subframe may configure one Physical Resource Block (PRB) 621 including 12 subcarriers in the vertical axis. For example, the one PRB 621 may include 14 OFDM symbols in the horizontal axis and 12 subcarriers in the vertical axis. In the subframe, a unit including one OFDM symbol and one subcarrier may be referred to as a Resource Element (RE). For example, one PRB 621 may include 12×14=168 REs.

According to various embodiments, when it is assumed that a frequency area allocated for the DSS is 5 MHz and Subcarrier Spacing (SCS) is 15 kHz, one subframe may include a total 25 PRBs 621 in the vertical axis. According to various embodiments, Synchronization Signal Blocks (SSBs) may be allocated to a total of 20 PRBs from a $2^{nd}$ PRB to a $21^{st}$ PRB among the 25 PRBs 621 for the $1^{st}$ subframe 611.

When it is assumed that the MBSFN subframe includes a total of 14 OFDM symbols from a $14^{th}$ symbol to a $27^{th}$ symbol, the control area 622 may be allocated to two symbols, such as a $14^{th}$ symbol and a $15^{th}$ symbol, and the MBSFN area 623 may be applied to $16^{th}$ symbol to $27^{th}$ symbol.

An LTE reference signal and/or an LTE control signal may be allocated to the control area 622 of the MBSFN subframe. For example, when subcarriers from the bottom to the top are designated to $0^{th}$ to $11^{th}$ subcarriers the control area 622, LTE Cell-specific Reference Signals (CRSS) may be allocated to $0^{th}$, $3^{rd}$, $6^{th}$, and $9^{th}$ subcarrier, A Physical Control Format Indictor Channel (PCFICH), a Physical Hybrid-ARQ Indicator Channel (PHICH), and a Physical Downlink Control Channel (PDCCH) may be allocated to the remaining subcarriers (for example, $1^{st}$, $2^{nd}$, $4^{th}$, $5^{th}$, $7^{th}$, $8^{th}$, $10^{th}$, and $11^{th}$ subcarriers) of the control area 622.

According to various embodiments, as the MBSFN subframes are configured as subframes for NR communication network data by the DSS, the NR communication network data may be allocated to the MBSFN area 623. For example, data for the NR communication network may be allocated to $16^{th}$ to $27^{th}$ symbols. According to various embodiments, a Control Resource Set (CORESET) corresponding to an NR PDCCH may be allocated to the $16^{th}$ symbol, an NR Physical Downlink Shared Channel (PDSCH) Demodulation Reference Signal (DMRS) may be allocated to the $17^{th}$ symbol and the $23^{rd}$ symbol, and an NR Physical Downlink Shared Channel (PDSCH) may be allocated to the remaining symbols (for example, $18^{th}$ $22^{nd}$ symbols and $24^{th}$ to $27^{th}$ symbols).

According to various embodiments, referring to FIG, 6A, the entire MBSFN area 623 in one MBSFN subframe except for the control area 622 may be used for allocating NR communication network data through supporting of the DSS using the MBSFN subframe.

Subsequently, referring to FIG. 6B, when the $2^{nd}$ subframe 612 is the non-MBSFN subframe which is not configured as the MBSFN subframe (for example, a subframe for LTE data transmission), the non-MBSFN subframe may include a control area 632 and a data area 633 (for example, LTE data area) as illustrated. In the non-MBSFN subframe illustrated in FIG. 6B, the horizontal axis may correspond to the time axis and the vertical axis may correspond to the frequency axis. One non-MBSFN subframe may include 14 OFDM symbols in the horizontal axis. The one non-MBSFN subframe may configure one Physical Resource Block (PRB) 631 including 12 subcarriers in the vertical axis. For example, the one PRB 631 may include 14 OFDM symbols in the horizontal axis and 12 subcarriers in the vertical axis. In the subframe, a unit including one OFDM symbol and one subcarrier may be referred to as a Resource Element (RE).

According to various embodiments, when it is assumed that a frequency area allocated for the DSS is 5 MHz and Subcarrier Spacing (SCS) is 15 kHz, one subframe may include a total 25 PRBs 631 in the vertical axis.

When it is assumed that the non-MBSFN subframe includes a total of 14 OFDM symbols from a $28^{th}$ symbol to a $41^{st}$ symbol, the control area 632 may be allocated to two left symbols, such as a $28^{th}$ symbol and a $29^{th}$ symbol, and the data area 633 may be applied to $30^{th}$ symbol to $41^{st}$ symbol.

An LTE reference signal and/or an LTE control signal may be allocated to the control area 632 of the non-MBSFN subframe. For example, when subcarriers from the bottom to the top are designated to $0^{th}$ to $11^{th}$ subcarriers in the control area 622, LTE Cell-specific Reference Signals (CRSs) may be allocated to $0^{th}$, $3^{rd}$, $6^{th}$, and $9^{th}$ subcarriers. PDCCHs may be allocated to the remaining subcarriers (for example, $1^{st}$, $2^{nd}$, $4^{th}$, $5^{th}$, $7^{th}$, $8^{th}$, $10^{th}$, and $11^{th}$ subcarriers) of the $28^{th}$ symbol in the control area 622.

According to various embodiments, as the non-MBSFN subframes are configured as subframes for NR communication network data by the DSS, the NR communication network data may be allocated to the data area 633. For example, data for the NR communication network ma be allocated to $30^{th}$ to $41^{st}$ symbols. According to various embodiments, a Control Resource Set (CORESET) corresponding to an NR PDCCH may be allocated to a $30^{th}$ symbol, an NR Physical Downlink Shared Channel (PDSCH) Demodulation Reference Signal (DMRS) may be allocated to $31^{st}$ to $40^{th}$ symbols, and an NR Physical Downlink Shared Channel (PDSCH) may be allocated to the remaining symbols (for example, $32^{nd}$ to $39^{th}$ and $41^{st}$ symbols).

According to various embodiments, referring to FIG. 6B, although the non-MBSFN subframe is allocated for transmitting and receiving data of the NR communication network, a CRS may be allocated for a function as the LTE subframe. The CRS is a reference signal transmitted with relatively high power and may be used for phase synchronization or channel estimation in the LTE communication network and used for maintaining time synchronization and frequency synchronization. For example, as illustrated in FIG. 6B, LTE Cell-specific Reference Signals (CRSs) may be allocated to $0^{th}$, $3^{rd}$, $6^{th}$, and $9^{th}$ subcarrier of $32^{nd}$, $35^{th}$, $36^{th}$ and $39^{th}$ symbols in the data area 633.

As the LTE CRSs are allocated to the data area 633, the NR PDSCH should be allocated to an RE to which the LTE CRS is not allocated in the data area 633, which may be referred to as CRS rate matching.

According to various embodiments, information of LTE CRS rate matching for a subframe to which the DSS is applied may be defined in the 3GPP TS 36.331 standard document to be transmitted in the form of Table 4 below.

TABLE 4

RateMatchPatternLTE-CRS information element
-- ASN1START
-- TAG-RATEMATCHPATTERNLTE-CRS-START
RateMatchPattemLTE-CRS ::= SEQUENCE {
carrierFreqDL INTEGER (0..16383),
camerBandwidthDL ENUMERATED {n6, n15, n25, n50, n75, n100, spare2, spare1},
mbsfn-SubframeConfigList EUTRA-MBSFN-SubframeConfigList OPTIONAL, -- Need M
nrofCRS-Ports ENUMERATED {n1, n2, n4},
v-Shift ENUMERATED {n0, n1, n2, n3, n4, n5}
}
LTE-CRS-PattemList-r16 ::= SEQUENCE (SIZE (1..maxLTE-CRS-Patterns-r16)) OF RateMatchPatternLTE-CRS
-- TAG-RATEMATCHPATTERNLTE-CRS-STOP
-- ASN1STOP According to various embodiments, in the non-MBSFN subframe illustrated in FIG. 6B, NR data (for example, NR PDSCH) may be allocated to a relatively smaller number of REs compared to the MBSFN subframe illustrated in FIG. 6A due to LTE CRS rate matching.

According to various embodiments, it has been illustrated that the number of antenna ports is 4 in the non-MBSFN subframe illustrated in FIG. 6B, the number and locations of CRSs may be variously changed according to a cell ID (for example, a Physical Cell ID (PCI)) and the number of antenna ports.

Hereinafter, a method of operating the electronic device according to various embodiments is described with reference to FIGS. 7 to 10. The operation in FIGS. 7 to 10 described below may be applied to one device illustrated in FIGS. 1, 2A, 2B, 3A, 3B, and 3C.

Figure 7:
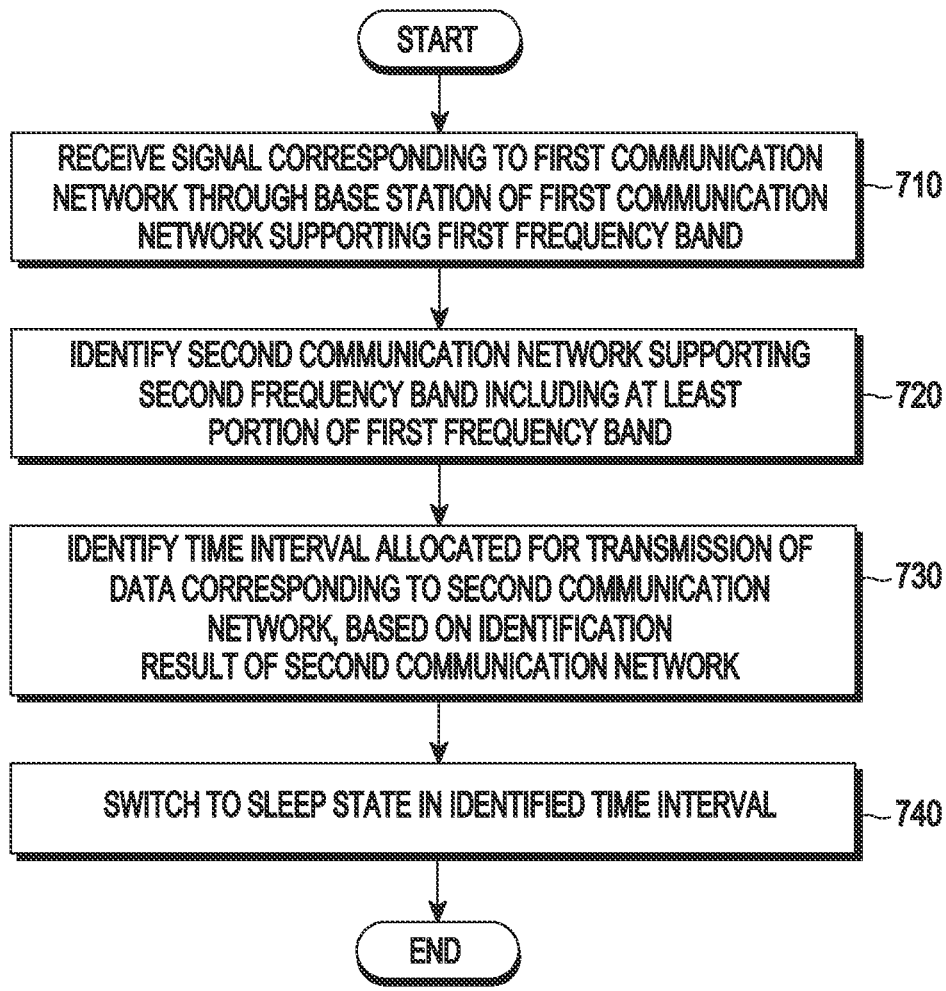
FIG. 7 is a diagram illustrating a method of controlling the electronic device according to an embodiment of the disclosure.

FIG. 7 is a diagram illustrating a method of controlling the electronic device according to an embodiment of the disclosure.

Referring to FIG. 7, the electronic device (for example, the first communication processor 212 of FIG. 2A or the integrated communication processor 260 of FIG. 2B) may receive a signal corresponding to a first communication network (NR) from a first base station corresponding to the first communication network (for example, the NR communication network) supporting a first frequency band in operation 710.

According to various embodiments, the electronic device 101 (for example, the first communication processor 212 or the integrated communication processor 260) may identify a second communication network (for example, the LTE communication network) supporting a second frequency band including at least one some of the first frequency band in operation 720. For example, the electronic device 101 may identify whether there is the second communication network supporting the second frequency band including at least a portion of the first frequency band in order to identify whether DSS is operated. According to various embodiments, the electronic device 101 may receive a signal corresponding to the first communication network or the second communication network and identify relevant information in order to identify whether the DSS is operated. According to various embodiments, methods by which the electronic device 101 identifies whether there is the second communication network on the basis of the identified relevant information are described in detail with reference to FIGS. 8, 9, and 10.

According to various embodiments, the electronic device 101 (for example, the first communication processor 212 or the integrated communication processor 260) may identify a time interval allocated for transmitting data corresponding to the second communication network on the basis of the identification result of the second communication network in operation 730. For example, when the electronic device 101 identifies the existence of the second communication network supporting the second frequency band including at least a portion of the first frequency band, it may be estimated that the electronic device 101 operates in the DSS (MBSFN-based DSS). As it is estimated that the electronic device 101 operates in the DSS, the electronic device 101 may identify the time interval (for example, time interval corresponding to the non-MBSFN subframe) allocated for transmitting data corresponding to the second communication network.

According to various embodiments, the electronic device 101 (for example, the first communication processor 212 or the integrated communication processor 260) may control switching to a sleep state in the identified time interval (for example, time interval corresponding to the non-MBSFN subframe) in operation 740. For example, the electronic device 101 may identify the time interval corresponding to the non-MBSFN subframe while operating in the MBSFN-based DSS and switch to the sleep state in the time interval corresponding to the non-MBSFN subframe, so as to control monitoring of unnecessary downlink control data to be not performed.

Figure 8:
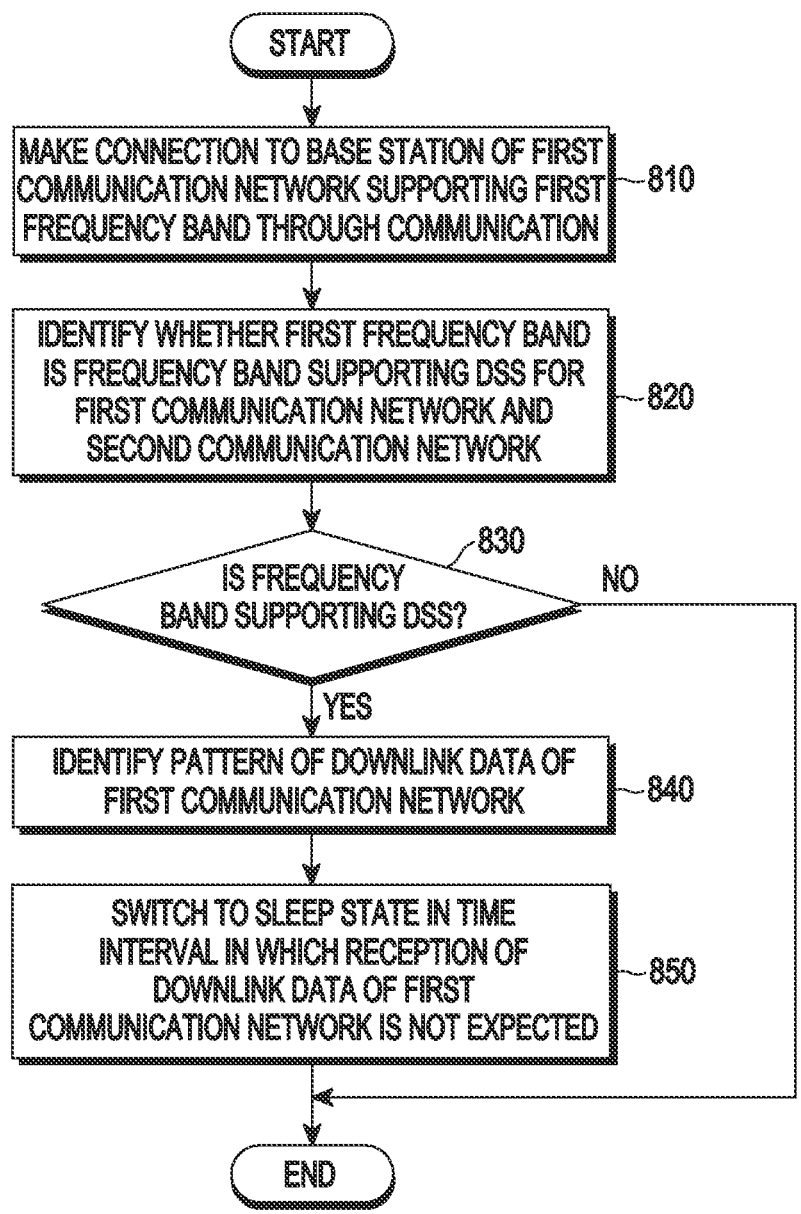
FIG. 8 is a diagram illustrating a method of controlling the electronic device according to an embodiment of the disclosure.

FIG. 8 is a diagram illustrating a method of controlling the electronic device according to an embodiment of the disclosure.

Referring to FIG. 8, the electronic device (for example, the first communication processor 212 of FIG. 2A or the integrated communication processor 260 of FIG. 2B) may be connected to a first base station corresponding to the first communication network (for example, the NR communication network) supporting a first frequency band and receive a signal corresponding to the first communication network (NR) from the first base station in operation 810.

According to various embodiments, the electronic device 101 (for example, the first communication processor 212 or the integrated communication processor 260) may identify a second communication network (for example, LTE communication network) supporting a second frequency band including at least a portion of the first frequency band. For example, the electronic device 101 may identify whether the first frequency band is a frequency band supporting the DSS for the first communication network and the second communication network in operation 820.

According to various embodiments, the electronic device 101 may identify whether the first frequency band (for example, NR frequency band) used for the currently connected first communication network is a frequency band supporting a DSS service. For example, the electronic device 101 may insert information indicating whether the DSS service for the frequency band supported by the electronic device 101 is supported into information (for example, UE capability information) to be transmitted to the first base station and transmit the information into the first base station. According to various embodiments, information indicating whether the DSS service is supported may be configured as shown in Table 5 according to definition in the 3GPP standard document 38.306.

TABLE 5

| | | | | |
|---|---|---|---|---|
| rateMatchingLTE-CRS<br>Indicates whether the UE supports receiving<br>PDSCH with resource mapping that excludes the<br>REs determined by the higher layer configuration<br>LTE-carrier configuring common RS, as specified<br>in TS 38.214[12] | Band | Yes | No | No |

According o various embodiments, the electronic device 101 may insert information indicating whether the DSS service for each frequency band is supported on the basis of definition in Table 5 above into UE capability information and transmit the UE capability information to the first base station. For example, the UE capability information may be configured as shown in Table 6 below.

TABLE 6

LTE RRC OTA Packet -- UL_DCCH / UECapabilityInformation
value UE-NR-Capability ::=
{
...
rf-Parameters
{
supportedBandListNR
{
{
bandNR 2
...
ue-PowerClass pc3,
rateMatchingLTE-CRS supported, Referring to Table 6, the information indicating whether the DSS service for each frequency band, such as "rateMatchingLTE-CRS supported" may be inserted into the UE capability information and the UE capability information may be transmitted to the first base station.

According to various embodiments, the electronic device 101 may hard code and store information on the corresponding frequency band in a binary within the communication processor (for example, the first communication processor 212 or the integrated communication processor 260) or store the same in a Non-Volatile (NV) area of the memory in order to transmit information indicating whether the DSS for each frequency band is supported in the UE capability information to the first base station. The electronic device 101 may identify whether a frequency band used for transmitting and receiving data to and from the first base station connected through the current communication is a frequency band supporting the DSS by identifying whether the DSS for each frequency band supported by the electronic device 101 is supported. When the currently used frequency band is the frequency band supporting the DSS on the basis of the identification result, the electronic device 101 may estimate that the electronic device currently operates in the MBSFN-based DSS.

According to various embodiments, the electronic device 101 may estimate whether the electronic device 101 currently operates in the MBSFN-based DSS according to whether the first base station supports the DSS. For example, for the electronic device 101 subscribing to a network service provider, the network service provider managing the first base station corresponding to the first communication network may provide requirements such as information on a first frequency band (for example, NR frequency band) which can be supported by the network service provider through the first base station corresponding to the first communication network (for example, NR) or a second frequency band (for example, LTE frequency band) which can be supported through a second base station corresponding to the second communication network (for example, LTE). The electronic device 101 may identify information on the first frequency band or the second frequency band supported by the network service provider according to the information provided by the network service provider. According to various embodiments, the information on the first frequency band or the second frequency band which should be supported by a Public Land Mobile Network (PLMN) (for example, Mobile Country Code (MCC) or Mobile Network Code (MNC)) may be changed, and information thereon may be provided to the electronic device 101. For example, the electronic device 101 may identify information on a frequency band supported according to the currently registered and used PLMN on the basis of PLMN information stored in a SIM card. According to various embodiments, the electronic device 101 may hard code and store the information on the first frequency band or the second frequency band supported by the network service provider in a binary within the communication processor (for example, the first communication processor 212 or the integrated communication processor 260) or store the same in a Non-Volatile (NV) area of the memory. Table 7 below shows information on the first frequency band and the second frequency band supported by the electronic device.

TABLE 7

| Frequency<br>band | First frequency<br>band (NR) | Second frequency<br>band (LTE) | Common use |
|---|---|---|---|
| 1 | o | x | x |
| 2 | o | o | o |
| 3 | x | x | x |
| 4 | o | x | x |
| 5 | o | o | o |

Referring to Table 7 above, a $2^{nd}$ frequency band and a $5^{th}$ frequency band are frequency band indexes supported in common in NR and LTE, and thus the electronic device 101 may estimate that the electronic device 101 currently operates in the DSS (for example, MBSFN-based DSS) when the electronic device 101 currently communicates with the first base station through the $2^{nd}$ frequency band or the $5^{th}$ frequency band.

According to various embodiments, the electronic device 101 may identify whether there are frequency bands overlapping each other for the first frequency band (for example, NR frequency band) and the second frequency band (for example, LTE frequency band) on the basis of information on a neighbor cell. For example, the electronic device 101 may identify frequency band information for the neighbor cell through an SIB (for example, SIB 5) including information related to frequency measurement or cell reselection between Radio Access Technologies (RATs) (Inter RAT (IRAT)) or identify frequency band information for the neighbor cell with reference to Measurement Object (MO) information provided from the first base station.

Table 8 and Table 9 below show the configuration of SIB 5 defined in the standard documents 36.331 and 38.331.

According to various embodiments, the electronic device 101 may identify whether there is the second frequency band overlapping the first frequency band on the basis of frequency band information of the previously connected second communication network. For example, the electronic device 101 may store information on the second base station corresponding to the second communication network on which the electronic device camps for a predetermined time in the memory. Table 10 below shows information on a base station on which the electronic device 101 recently camps.

TABLE 10

| History # | RAT | arfcn |
|---|---|---|
| 1 | NR | 176300 |
| 2 | LTE | 900 |
| 3 | NR | 392000 |

TABLE 8

```
InterFreqCarrierFreqInfo ::= SEQUENCE {
    dl-CarrierFreq              ARFCN-ValueEUTRA,
    q-RxLevMin                  Q-RxLevMin,
    p-Max                       P-Max                           OPTIONAL, -- Need OP
    t-ReselectionEUTRA          T-Reselection,
    t-ReselectionEUTRA-SF       SpeedStateScaleFactors          OPTIONAL, -- Need OP
    threshX-High                ReselectionThreshold,
    threshX-Low                 ReselectionThreshold,
    allowedMeasBandwidth        AllowedMeasBandwidth,
    presenceAntennaPort1        PresenceAntennaPort1,
    cellReselectionPriority     CellReselectionPriority         OPTIONAL, -- Need OP
    neighCellConfig             NeighCellConfig,
    q-OffsetFreq                Q-OffsetRange                   DEFAULT dB0,
    interFreqNeighCellList      InterFreqNeighCellList          OPTIONAL, -- Need OR
    interFreqBlackCellList      InterFreqBlackCellList          OPTIONAL, -- Need OR
    ...,
    [[ q-QualMin-r9             Q-QualMin-r9                    OPTIONAL, -- Need OP
       threshX-Q-r9             SEQUENCE {
          threshX-HighQ-r9          ReselectionThresholdQ-r9,
          threshX-LowQ-r9           ReselectionThresholdQ-r9
       }                                                        OPTIONAL -- Cond RSRQ
    ]],
    [[ q-QualMinWB-r11          Q-QualMin-r9                    OPTIONAL -- Cond WB-RSRQ
    ]]
}
```

TABLE 9

```
SIB5 ::=                    SEQUENCE {
    carrierFreqListEUTRA        CarrierFreqListEUTRA            OPTIONAL, -- Need R
    t-ReselectionEUTRA          T-Reselection,
    t-ReselectionEUTRA-SF       SpeedStateScaleFactors          OPTIONAL, -- Need S
    lateNonCriticalExtension    OCTET STRING                    OPTIONAL,
    ...
}
```

According to various embodiments, the electronic device 101 may identify information on the neighbor cell included in SIB 5 as defined in Table 8 or Table 9 above and identify whether there is the second frequency band (for example, LTE frequency band) of the second base station overlapping the first frequency band (for example, NR frequency band) currently used for communication with the first base station. When there is an overlapping frequency band on the basis of the identification result, the electronic device 101 may estimate that the electronic device currently operates in the DSS (for example, MBSFN-based DSS).

Referring to Table 10 above, the electronic device 101 may identify that an absolute radio-frequency channel number (arfcn) indicating frequency band information of the LTE eNB among base stations on which the electronic device 101 recently camps is 900, and identify whether the frequency overlaps the frequency band currently used for communication with the first base station corresponding to the first communication network. When there is an overlapping frequency band on the basis of the identification result, the electronic device 101 may estimate that the electronic device currently operates in the DSS (for example, MBSFN-based DSS).

Figure 11:
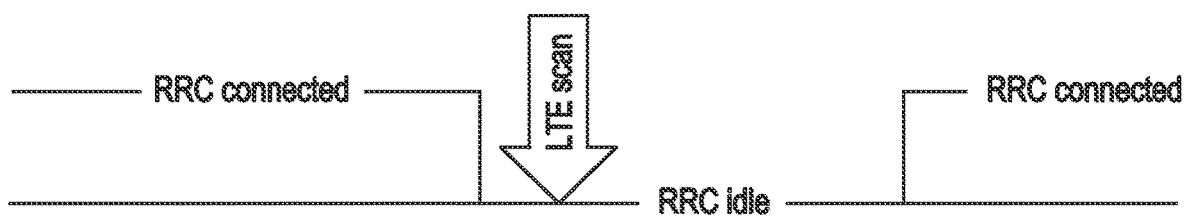
FIG. 11 is a diagram illustrating a long term evolution (LTE) scan operation of the electronic device according to an embodiment of the disclosure.

FIG. 11 is a diagram illustrating an LTE scan operation of the electronic device according to an embodiment of the disclosure.

Referring to FIG. 11, according to various embodiments, the electronic device 101 may scan a frequency band corresponding to the second communication network while communicating with the first base station corresponding to the first communication network. For example, the electronic device 101 may identify information on a neighbor LTE base station by performing the LTE scan operation in an RRC idle state or a Connected mode Discontinuous Reception (CDRX) sleep state or a measurement gap time point while communicating with the first base station corresponding to the first communication network. According to various embodiments, the electronic device 101 may identify at least one of an LTE signal level, an LTE band, an LTE bandwidth, a cell ID, and a PLMN for the LTE band by decoding a Primary Synchronization Signal (PSS)/Secondary Synchronization Signal (SSS) through the LTE scan operation. The electronic device 101 may determine how much the corresponding neighbor LTE base station is close to the NR gNB which currently communicates and determine whether the neighbor LTE eNB is a base station which can operate in the DSS. The electronic device 101 may identify how much the NR frequency band currently used by the electronic device overlaps the LTE bandwidth. According to various embodiments, the electronic device 101 may acquire PLMN information by decoding SIB 1 through the LTE scan and may identify whether a communication service provider of the NR frequency band used by the electronic device 101 is a PLMN service provider on the basis of the PLMN information.

According to various embodiments, when the electronic device 101 (for example, the first communication processor 212 or the integrated communication processor 260) identifies that the first frequency band (for example, NR frequency band) used for the currently connected first communication network is a frequency band supporting the DSS service and does not receive LTE MBSFN information related to the DSS from the first base station in operation 830, it may be estimated that the electronic device operates in the MBSFN-based DSS described above with reference to FIG. 5A or 6A.

According to various embodiments, when the electronic device 101 (for example, the first communication processor 212 or the integrated communication processor 260) identifies the first frequency band is the frequency band supporting the DSS service in operation 830 (Yes of operation 830), the electronic device may identify a pattern of downlink data in the first communication network in operation 840. For example, the electronic device 101 may identify a pattern of a slot (or subframe) for receiving control data (for example, a Downlink Control Indicator (DCI)) among downlink data received for a preset time (for example, 50 ms or 100 ms).

According to various embodiments, the electronic device 101 may receive an RRC reconfiguration message as shown in Table 11 below from the first base station, and monitor DCI on the basis of the location of a symbol for transmission of a PDCCH signal included in the received message.

TABLE 11

NR5G RRC OTA Packet -- RRC_RECONFIG
...
commonSearchSpaceList
{
{

TABLE 11-continued searchSpaceId 1,
controlResourceSetId 1,
monitoringSlotPeriodicityAndOffset sl1 : NULL,
monitoringSymbolsWithinSlot '00100000 000000'B, For example, referring to Table 11 above, the electronic device 101 may identify that the symbol for transmission of the PDCCH signal may be configured in the $2^{nd}$ symbol through the RRC reconfiguration message received from the first base station.

Figure 12:
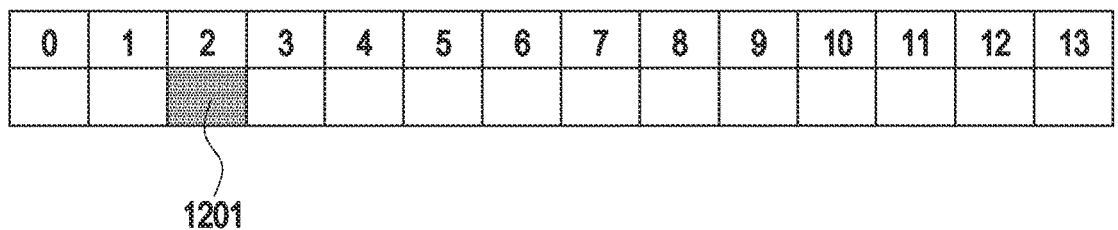
FIG. 12 is a diagram illustrating symbols to which New Radio (NR) control data is allocated according to an embodiment of the disclosure.

FIG. 12 is a diagram illustrating symbols to which NR control data is allocated according to an embodiment of the disclosure.

Referring to FIG. 12, NR slots (NR data transmission/reception interval) received through the MBSFN subframe may include 14 symbols from a $0^{th}$ symbol to a $13^{th}$ symbol. According to various embodiments, a $0^{th}$ symbol and a $1^{st}$ symbol in the MBSFN subframe are configured for transmission of an LTE PDCCH signal, and thus the base station of the NR communication network may transmit data through the remaining 12 symbols (for example, $2^{nd}$ symbol to $13^{th}$ symbol). For example, since the PDCCH signal is configured to be transmitted in the $2^{nd}$ symbol as shown in Table 11 above, the PDCCH signal may be transmitted through the $2^{nd}$ symbol 1201 among 14 symbols included in the entire slats in FIG. 12. According to various embodiments, the electronic device 101 may identify whether DCI is allocated by monitoring the $2^{nd}$ symbol 1201 in each slot.

Figure 13:
FIG. 13 is a diagram illustrating a method of identifying the non-MBSFN subframe using a pattern of NR control data according to an embodiment of the disclosure.

FIG. 13 is a diagram illustrating a method of identifying the non-MBSFN subframe using a pattern of NR control data according to an embodiment of the disclosure.

The electronic device 101 may identify whether DCI is allocated in every slot for a predetermined time (for example, 5 radio frames).

Referring to FIG. 13, it may be noted that DCI is allocated in a $1^{st}$ slot, a $6^{th}$ slot, and a $7^{th}$ slot in a first radio frame, DCI is allocated in a $1^{st}$ slot, a $2^{nd}$ slot, and a $7^{th}$ slot in a second radio frame, DCI is allocated in a $1^{st}$ slot, a $6^{th}$ slot, and a $7^{th}$ slot in a third radio frame, DCI is allocated in a $1^{st}$ slot and a $2^{nd}$ slot in a fourth radio frame, and DCI is allocated in a $1^{st}$ slot and a $6^{th}$ slot in a fifth radio frame.

According to various embodiments, the electronic device 101 (for example, the first communication processor 212 or the integrated communication processor 260) may perform control to switch to a sleep state in a time interval expected that no downlink data of the first communication network is received therein in operation 850. For example, the electronic device 101 may measure the MBSFN subframe and the non-MBSFN subframe through the pattern of the slot to which the DCI identified for the predetermined time is allocated and perform control to switch to a sleep state in a time interval expected that no downlink data of the first communication network is received therein (for example, a time interval estimated as the non-MBSFN subframe).

According to various embodiments, referring back to FIG. 13, a time interval corresponding to the $1^{st}$ t, the $2^{nd}$, the $6^{th}$ slot, and the $7^{th}$ slot which are slots in which DCI is identified at least once through the DCI allocation pattern identified during 5 radio frames may be estimated as a time interval configured as the MBSFN subframe. The electronic device 101 may maintain a state of monitoring DCI in the time interval configured as the MBSFN subframe (for example, the time interval corresponding to the $1^{st}$ slot, the $2^{nd}$ slot, the $6^{th}$ slot, and $7^{th}$ slot). According to various embodiments, the electronic device 101 may estimate a time interval corresponding to a $0^{th}$ slot, a $3^{rd}$ slot, a $4^{th}$ slot, a $5^{th}$ slot, an $8^{th}$ slot, and a $9^{th}$ slot in which the DCI is never identified for the predetermined time as a time interval that is not configured as the MBSFN subframe, and operate to switch to a sleep state in the time interval that is estimated to not be configured as the MBSFN subframe (for example, the time interval corresponding to the non-MBSFN subframe).

According to various embodiments, when an RRC state is changed (for example, change to an RRC idle state or reception of RRC reconfiguration), the electronic device 101 may initialize and reset the DCI allocation pattern illustrated in FIG. 13.

According to various embodiments, the electronic device 101 (for example, the first communication processor 212 or the integrated communication processor 260) may not perform operation 840 and operation 850 when the first frequency band is not identified as the frequency band supporting the DSS service in operation 830 (No of operation 830).

Figure 9:
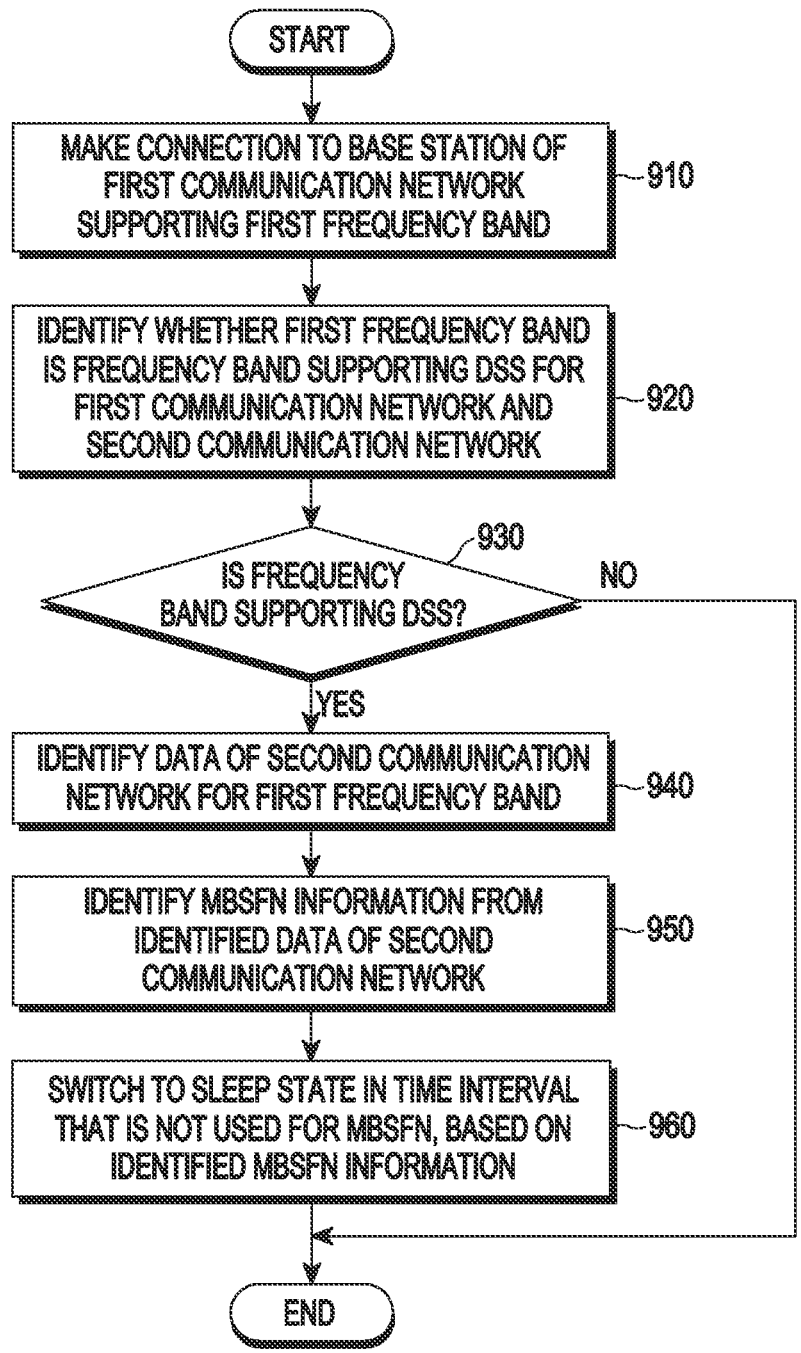
FIG. 9 is a diagram illustrating a method of controlling the electronic device according to an embodiment of the disclosure.

FIG. 9 is a diagram illustrating a method of controlling the electronic device according to an embodiment of the disclosure.

Referring to FIG. 9 below, a description overlapping the description made with reference to FIG. 8 will be omitted. Referring to FIG. 9, the electronic device (for example, the first communication processor 212 of FIG, 2A or the integrated communication processor 260 of FIG. 2B) may be connected to first base station corresponding to the first communication network (for example, the NR communication network) supporting a first frequency band through communication and receive a signal corresponding to the first communication network (NR) from first base station the in operation 910.

According to various embodiments, the electronic device 101 (for example, the first communication processor 212 or the integrated communication processor 260) may identify a second communication network (for example, LTE communication network) supporting a second frequency band including at least a portion of the first frequency band. For example, the electronic device 101 may identify whether the first frequency band is a frequency band supporting the DSS for the first communication network and the second communication network in operation 920. Since the embodiments described in operation 820 of FIG. 8 may be equally or similarly applied to the operation of whether the first frequency band is the frequency band supporting the DSS in operation 920, a detailed description thereof is omitted.

According to various embodiments, when the electronic device 101 (for example, the first communication processor 212 or the integrated communication processor 260) identifies that the first frequency band (for example, NR frequency band) used for the currently connected first communication network is a frequency band supporting the DSS service and does not receive LTE MBSFN information related to the DSS from the first base station in operation 930, it may be estimated that the electronic device operates in the MBSFN-based DSS described above with reference to FIG. 5A or 6A.

According to various embodiments, when the electronic device 101 (for example, the first communication processor 212 or the integrated communication processor 260) identifies that the first frequency band is the frequency band supporting the DSS service in operation 930 (Yes of operation 930), the electronic device may identify data of the second communication network for a frequency band which is the same as the first frequency band currently used in the DSS in operation 940. For example, the electronic device 101 may acquire MBSFN information of LTE being used in the DSS through the LTE scan operation as illustrated in FIG. 11.

According to various embodiments, the electronic device 101 may identify SIB 2 by decoding a signal transmitted from a neighbor LTE eNB through the LTE scan operation. For example, SIB 2 may include MBSFN subframe allocation information (for example, an allocation period, an offset, and allocated subframes in a radio frame). According to various embodiments, the electronic device 101 may identify a time interval corresponding to the MBSFN subframe through SIB 2 in operation 950.

According to various embodiments, the electronic device 101 (for example, the first communication processor 212 or the integrated communication processor 260) may perform control to switch to a sleep state in a time interval (for example, a time interval corresponding to the non-MBSFN subframe) that is not used for the MBSFN in operation 960 on the basis of the MBSFN information identified in operation 950.

Figure 14:
FIG. 14 is a diagram illustrating the control of the sleep operation of the electronic device receiving LTE MBSFN information according to an embodiment of the disclosure.

FIG. 14 is a diagram illustrating control of the sleep operation of the electronic device receiving LTE MBSFN information according to an embodiment of the disclosure.

Referring to FIG. 14, a time interval corresponding to a $1^{st}$ slot, a $2^{nd}$ slot, a $7^{th}$ slot, and an $8^{th}$ slot may be identified as a time interval configured as the MBSFN subframe through the identification of SIB 2. The electronic device 101 may maintain a state of monitoring DCI in the time interval configured the time interval configured as the MBSFN subframe (for example, the time interval corresponding to the $1^{st}$ slot, the $2^{nd}$ slot, the $7^{th}$ slot, and $8^{th}$ slot). According to various embodiments, the electronic device 101 may operate to switch to the sleep state in the time interval that is not configured as the MBSFN subframe (for example, a time interval corresponding to a $0^{th}$ slot, a $3^{rd}$ slot, a $4^{th}$ slot, a $5^{th}$ slot, a $6^{th}$ slot, and a $9^{th}$ slot).

According to various embodiments, when an RRC state is changed (for example, change to an RRC idle state or reception of RRC reconfiguration), the electronic device 101 may initialize and reset the pattern illustrated in FIG. 14.

According to various embodiments, when the electronic device 101 (for example, the first communication processor 212 or the integrated communication processor 260) identifies that the first frequency band is not the frequency band supporting the DSS service in operation 930 (No of operation 930), operation 940, operation 950, and operation 960 may not be performed.

Figure 10:
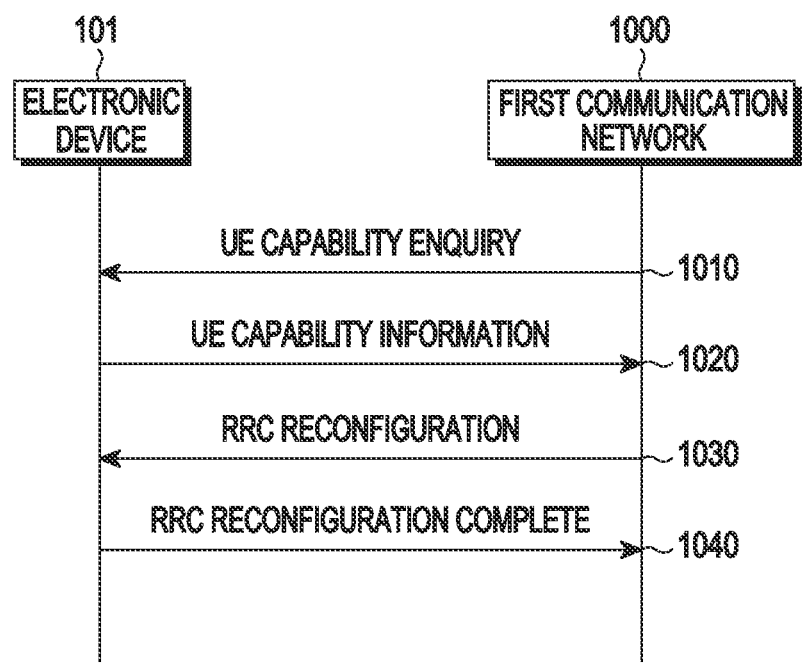
FIG. 10 is a diagram illustrating a method of controlling the electronic device according to an embodiment of the disclosure.

FIG. 10 is a diagram illustrating a method of controlling the electronic device according to an embodiment of the disclosure.

According to various embodiments, even when the electronic device 101 operates in MBSFN-based DSS as illustrated in FIG. 5A, the first base station may perform control to transmit LTE CRS information (for example, "RateMatchPatternLTE-CRS" information) to the electronic device 101.

Referring to FIG. 10, according to various embodiments, a first communication network 1000 (for example, the first base station) may transmit a UE capability enquiry message to the electronic device 101 in operation 1010. The electronic device 101 may receive the UE capability enquiry message from the first communication network 1000 and transmit UE capability information to the first communication network 1000 corresponding thereto in operation 1020. According to various embodiments, the UE capability information may include information indicating whether the DSS service is supported for each frequency band as shown in Table 6, such as "rateMatchingLTE-CRS supported."

According to various embodiments, the first communication network 1000 may identify whether the electronic device 101 supports the DSS service by identifying information included in the UE capability information. When it is determined that the electronic device 101 supports the DSS service on the basis of the identification result, the first communication network 1000 may insert information on the MBSFN area and/or information on the LTE CRS location into the RRC reconfiguration message and transmit the RRC reconfiguration message to the electronic device 101 in operation 1030. The electronic device 101 may transmit an RRC reconfiguration complete message to the first communication network 1000 in response to reception of the RRC reconfiguration message in operation 1040.

According to various embodiments, the RRC reconfiguration message which the first communication network 1000 transmits to the electronic device 101 may include information on the MBSFN area in the form shown in Table 12 or Table 13 below.

TABLE 12

```
RateMatchPatternLTE-CRS ::=            SEQUENCE {
carrierFreqDL                          INTEGER (0..16383),
carrierBandwidthDL                        ENUMERATED {n6, n15, n25, n50, n75, n100, spare2,
spare1},
mbsfn-SubframeConfigList EUTRA-MBSFN-SubframeConfigList OPTIONAL,
-- Need M
nrofCRS-Ports ENUMERATED {n1,n2,n4},          OPTIONAL, -- Need M
   v-Shift                             ENUMERATED {n0, n1, n2, n3, n4, n5} OPTIONAL, -- Need M
}
```

TABLE 13

```
RateMatchPatternLTE-CRS ::=            SEQUENCE {
carrierFreqDL                          INTEGER (0..16383),
carrierBandwidthDL                        ENUMERATED {n6, n15, n25, n50, n75, n100, spare2,
spare1},
mbsfn-SubframeConfigList EUTRA-MBSFN-SubframeConfigList OPTIONAL,
-- Need M
nrofCRS-Ports ENUMERATED {n1, n2, n4},        =>invalid value {n0}
   v-Shift ENUMERATED {n0, n1, n2, n3, n4, n5} =>invalid value {n7}
}
```

According to various embodiments, when the electronic device 101 performs the MBSFN-based DSS operation, LTE CRS rate matching is not needed, and thus unnecessary parameters of "nrofCRS-Ports" and "v-Shift" may be omitted as shown in Table 12 or an invalid value may be used as shown in Table 13 to inform that the MBSFN-based DSS operation is being performed.

According to various embodiments, the electronic device 101 (for example, the first communication processor 212 or the integrated communication processor 260) may identify information on the MBSFN area included in Table 12 or Table 13 and perform control to switch to the sleep state in a time interval corresponding to the non-MBSFN subframe. For example, the electronic device 101 may identify the time interval corresponding to the non-MBSFN subframe while operating in the MBSFN-based DSS and switch to the sleep state in the time interval corresponding to the non-MBSFN subframe, so as to control monitoring of unnecessary downlink control data to be not performed.

An electronic device according to one of various embodiments includes a communication processor, at least one Radio Frequency Integrated Circuit (RFIC) connected to the communication processor, and an antenna connected through the at least one RFIC and configured to transmit and receive a signal corresponding to at least one communication network, wherein the communication processor is configured to control the electronic device to receive a signal corresponding to a first communication network from a first base station corresponding to the first communication network supporting a first frequency band through the antenna, identify information related to a second communication network supporting a second frequency band including at least a portion of the first frequency band, identify a time interval allocated for transmission of data corresponding to the second communication network on the basis of the information related to the second communication network, and control the electronic device to operate in a sleep state in the identified time interval.

According to various embodiments, the communication processor may control not to identify control data corresponding to the first communication network in the sleep state.

According to various embodiments, the communication processor may identify the time interval allocated for transmission of the data corresponding to the second communication network when there is the second communication network supporting the second frequency band including at least a portion of the first frequency band.

According to various embodiments, the communication processor may identify whether there is the second communication network on the basis of frequency band information related to a neighbor base station of the first base station.

According to various embodiments, the communication processor may identify whether there is the second communication network on the basis of frequency band information of the previously connected second communication network.

According to various embodiments, the first communication network may be a 5G communication network, and the second communication network may be an LTE communication network.

According to various embodiments, the communication processor may identify the time interval allocated for transmission of the data corresponding to the second communication network on the basis of a reception pattern of downlink control data received from the first base station.

According to various embodiments, the communication processor may receive a signal transmitted from a second base station corresponding to the second communication network for a preset time and identify the time interval allocated for transmission of the data corresponding to the second communication network from the received signal.

According to various embodiments, the communication processor may identify the time interval allocated for transmission of the data corresponding to the second communication network on the basis of information received from the first base station corresponding to the first communication network.

According to various embodiments, the time interval allocated for transmission of the data corresponding to the second communication network may correspond to a non-Multimedia Broadcast multicast service Single Frequency Network subframe.

A method of controlling an electronic device according to one of various embodiments includes receiving a signal corresponding to a first communication network from a first base station corresponding to the first communication network supporting a first frequency band through the antenna, identifying information related to a second communication network supporting a second frequency band including at least a portion of the first frequency band, identifying a time interval allocated for transmission of data corresponding to the second communication network on the basis of the information related to the second communication network, and controlling the electronic device to operate in a sleep state in the identified time interval.

According to various embodiments, the method may further include controlling the electronic device not to identify control data corresponding to the first communication network in the sleep state.

According to various embodiments, the method may further include identifying the time interval allocated for transmission of the data corresponding to the second communication network when there is the second communication network supporting the second frequency band including at least a portion of the first frequency band.

According to various embodiments, the method may further include identifying whether there is the second communication network on the basis of frequency band information related to a neighbor base station of the first base station.

According to various embodiments, the method may further include identifying whether there is the second communication network on the basis of frequency band information of the previously connected second communication network.

According to various embodiments, the first communication network may be a 5G communication network, and the second communication network may be an LTE communication network.

According to various embodiments, the method may further include identifying the time interval allocated for transmission of the data corresponding to the second communication network on the basis of a reception pattern of the downlink control data received from the first base station.

According to various embodiments, the method may further include receiving a signal transmitted from a second base station corresponding to the second communication network for a preset time and identifying the time interval allocated for transmission of the data corresponding to the second communication network from the received signal.

According to various embodiments, the method may further include identifying the time interval allocated for transmission of the data corresponding to the second communication network on the basis of information received from the first base station corresponding to the first communication network.

According to various embodiments, the time interval allocated for transmission of the data corresponding to the second communication network may correspond to a non-Multimedia Broadcast multicast service Single Frequency Network subframe.

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a task performing device). For example, a processor of the machine (e.g., the master device or the task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a communication processor;
at least one radio frequency integrated circuit (RFIC) connected to the communication processor;
an antenna connected to the at least one RFIC and configured to transmit and receive a signal corresponding to at least one communication network, and
memory storing instructions,
wherein the instructions, when executed by the communication processor, cause the electronic device to:
control the electronic device to receive a signal corresponding to a first communication network from a first base station corresponding to the first communication network supporting a first frequency band, through the antenna,
identify information related to a second communication network supporting a second frequency band including at least a portion of the first frequency band,
identify a time interval allocated for transmission of data corresponding to the second communication network, based on the information related to the second communication network, and
control the electronic device to operate in a sleep state in the identified time interval,
wherein, when the first base station corresponding to a long term evolution (LTE) communication network does not transmit broadcast service data through predetermined subframes configured as multimedia broadcast multicast service single frequency network (MBSFN) subframes or does not transmit any data, dynamic spectrum sharing (DSS) in a time division multiplexing scheme is applied through the predetermined subframes.

2. The electronic device of claim 1, wherein the instructions further cause the electronic device to control to refrain from identifying control data corresponding to the first communication network while in the sleep state.

3. The electronic device of claim 1, wherein the instructions further cause the electronic device to identify the time interval allocated for transmission of the data corresponding to the second communication network when there is the second communication network supporting the second frequency band including at least the portion of the first frequency band.

4. The electronic device of claim 1, wherein the instructions further cause the electronic device to:
receive a signal transmitted from a second base station corresponding to the second communication network for a preset time, and
identify the time interval allocated for transmission of the data corresponding to the second communication network from the received signal.

5. The electronic device of claim 1, wherein the first base station corresponds to new radio (NR) communication network data in at least one subframe in which the LTE communication network data is not transmitted among predetermined subframes which are not configured as the MBSFN subframes and which are allocated for use by a second base station of the LTE communication network.

6. One or more non-transitory computer-readable storage media storing one or more programs including computer-executable instructions that, when executed by one or more processors of an electronic device individually or collectively, cause to the electronic to perform operations, the operations comprising:
receiving a signal corresponding to a first communication network from a first base station corresponding to the first communication network supporting a first frequency band through an antenna;
identifying information related to a second communication network supporting a second frequency band including at least a portion of the first frequency band;
identifying a time interval allocated for transmission of data corresponding to the second communication network, based on the information related to the second communication network; and
controlling the electronic device to operate in a sleep state in the identified time interval,
wherein, when the first base station corresponding to a long term evolution (LTE) communication network does not transmit broadcast service data through predetermined subframes configured as multimedia broadcast multicast service single frequency network (MBSFN) subframes or does not transmit any data, dynamic spectrum sharing (DSS) in a time division multiplexing scheme is applied through the predetermined subframes.

7. The one or more non-transitory computer-readable storage media of claim 6, the operations further comprise controlling the electronic device to refrain from identifying control data corresponding to the first communication network while in the sleep state.

8. The one or more non-transitory computer-readable storage media of claim 6, the operations further comprise identifying the time interval allocated for transmission of the data corresponding to the second communication network when there is the second communication network supporting the second frequency band including at least the portion of the first frequency band.

9. The one or more non-transitory computer-readable storage media of claim 8, the operations further comprise identifying whether there is the second communication network, based on frequency band information related to a neighbor base station of the first base station.

10. The one or more non-transitory computer-readable storage media of claim 6, wherein the first base station corresponds to new radio (NR) communication network data in at least one subframe in which the LTE communication network data is not transmitted among predetermined subframes which are not configured as the MBSFN subframes and which are allocated for use by a second base station of the LTE communication network.

\* \* \* \* \*